(12) United States Patent
Matsubara et al.

(10) Patent No.: US 6,343,246 B1
(45) Date of Patent: Jan. 29, 2002

(54) CONTROL SYSTEM FOR A HYBRID VEHICLE

(75) Inventors: Atsushi Matsubara; Hideyuki Oki; Shinichi Kitajima; Kazutomo Sawamura; Hideyuki Takahashi; Kan Nakaune; Hiroyuki Makino; Teruo Wakashiro, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/627,124

(22) Filed: Jul. 27, 2000

(30) Foreign Application Priority Data

Jul. 30, 1999 (JP) .......................... 11-218218
Aug. 18, 1999 (JP) .......................... 11-232027

(51) Int. Cl.$^7$ .......................... B60L 7/20; B60K 25/00
(52) U.S. Cl. .......................... 701/22; 701/41; 180/65.1; 180/65.5
(58) Field of Search .......................... 701/22, 41; 180/65.1, 180/65.2, 65.3, 220, 65.5; 318/139, 376; 280/735

(56) References Cited

FOREIGN PATENT DOCUMENTS

JP     07-123509     5/1995

Primary Examiner—Tan Nguyen
(74) Attorney, Agent, or Firm—Armstrong, Westerman, Hattori, McLeland & Naughton, LLP

(57) ABSTRACT

A control system for a hybrid vehicle with a combustion engine is provided for outputting driving force, an electric motor for generating a force for assisting the output from the engine, and a power storage unit for supplying a power to the motor and for storing energy regenerated by the motor when the vehicle decelerates. The control system includes an assistance determining device for determine whether to assist the output from the engine by the motor, depending on the driving condition of the vehicle; a first assistance amount determining device for determining a first assistance amount, depending on the driving condition of the vehicle, when the assistance determining device determines to perform the assist; a second assistance amount determining device for determining a second assistance amount, when a driver's intention to accelerate the vehicle exceeds a predetermined standard; and an assistance control device for driving the motor to assist the output from the engine, based on the first assistance amount when a driver's intention to accelerate the vehicle does not exceed a predetermined standard, and based on the second assistance amount when the driver's intention to accelerate the vehicle exceeds the predetermined standard.

9 Claims, 32 Drawing Sheets

CONTROL SYSTEM FOR A HYBRID VEHICLE

BACKGROUND OF THE INVENTION

1. Field of the Invention

The present invention relates to a control system for a hybrid vehicle which can appropriately respond to a request of a driver to assist an engine output by an electric motor.

This application is based on Japanese Patent Application Nos. Hei 11-218218, and Hei 11-232027, the contents of which are incorporated herein by reference.

2. Description of the Related Art

Conventionally, hybrid vehicles which carry electric motors as power sources for driving the vehicles in addition to engines are known. In the conventional hybrid vehicles, there are parallel hybrid vehicles which use motors as assisting driving sources for assisting the output from the engines. The parallel hybrid vehicle assists the output from the engine by the motor when the vehicle accelerates, charges a battery by deceleration regeneration when the vehicle decelerates, and performs various controls, to respond to the driver's demand while maintaining the remaining charge of the battery (as disclosed in Japanese Unexamined Patent Application, First Publication Hei 7-123509).

The determination as to whether to require the assistance depends on whether the opening state of a throttle exceeds a predetermined threshold value. When it exceeds the threshold value, the motor is activated to assist the output from the engine.

In the hybrid vehicle, a gasoline engine takes various measures to improve fuel consumption by, e.g., storing the thermal energy discharged from a brake unit as regenerated energy in the battery. To further improve fuel consumption, for example, a gear shift design been developed herein the gear ratios are made high enough such that the vehicle can travel at a low engine speed.

However, a vehicle with high ratio gears may not accelerate as the driver expects, for example, when a driver releases an accelerator pedal before a curve and accelerates the vehicle at the end of the curve. This decreases the commercial value of the vehicle.

In a vehicle with the high ratio gears, the gear ratio of the first gear is normal to guarantee the torque required to start the vehicle, while the gear ratio of the second gear is spaced much higher. Therefore, the engine speed suddenly varies when the gear is shifted up to second gear, and accordingly a sudden variation may be caused in the driving force.

While the conventional hybrid vehicle assists the output from the engine by the motor according to the driver's intention to accelerate the vehicle, there are various types of the driver's intention, depending on the driving conditions. For example, the driver may wish to accelerate continuously, to accelerate only in a short period of time at the time of starting, or to accelerate instantaneously at the time of a shift-change action.

Accordingly, the conventional vehicle cannot sufficiently respond to the driver's demand simply by judging the presence or absence of the driver's intention to accelerate and performing the fixed assistance by the motor.

SUMMARY OF THE INVENTION

It is therefore an object of the present invention to provide a control system for a hybrid vehicle which can improve its acceleration performance and can shift up smoothly.

It is another object of the present invention to provide an assistance control system for a hybrid vehicle which can appropriately respond to a driver's assistance request.

In a first aspect of the present invention, the control system is provided for a hybrid vehicle with an engine (E) for outputting a driving force, a motor (M) for generating a force for assisting the output from the engine, and a power storage unit (3) for supplying a power to the motor and for storing energy regenerated by the motor when the vehicle decelerates. The control system comprises: an assistance determining device (S125, S136) for determine whether to assist the output from the engine by the motor, depending on the driving condition of the vehicle; a first assistance amount determining device (S239) for determining a first assistance amount, depending on the driving condition of the vehicle, when the assistance determining device determines to perform the assist; a second assistance amount determining device (S401) for determining a second assistance amount (SCRAST), when a driver's intention to accelerate the vehicle exceeds a predetermined standard; and an assistance control device (1) for driving the motor to assist the output from the engine, based on the first assistance amount when a driver's intention to accelerate the vehicle does not exceed a predetermined standard, and based on the second assistance amount when the driver's intention to accelerate the vehicle exceeds the predetermined standard.

According to the first aspect of the invention, the assistance control device drives the motor to assist the output from the engine, based on the second assistance amount depending on e.g., the engine speed, when the driver's intention to accelerate the vehicle exceeds the predetermined standard. Thus, the assistance by the motor can be responsive to an instantaneous assistance request by the driver. Even if a turning vehicle decreases the engine speed to an idle state and accelerates after turning, the acceleration is improved, and the commercial value of the vehicle is increased. Even when in an MT vehicle the differences in the ratios between the first and second gears, and between the second and third gear ratios, the variation in the output is decreased when shifting the gear up. Therefore, when the gear ratios are set high to improve fuel consumption, sufficient acceleration and a smooth shift-up action of the gear can be ensured.

In a second aspect of the present invention, the control system for a hybrid vehicle further comprises: an assistance time determining device (S305) for determining a period of time to maintain the assistance based on the second assistance amount; and an assistance amount gradual changer (S405, S408, S409, S229, S230, S231) for gradually increasing the present assistance amount to the second assistance amount at the beginning of the period of time set by the assistance time determining device, and for gradually decreasing the second assistance amount at the end of the set period of time.

When the driver wishes to accelerate the vehicle, the present assistance amount is gradually increased to the set assistance amount in the time of period set by the assistance time determining device, so that the acceleration is made smooth and comfortable, as compared with the case when suddenly increasing the assistance amount.

Further, at the end of the assistance time set by the assistance time determining device, the assistance amount is gradually decreased so that the vehicle can smoothly return to the normal state (in which F_MASTSCR=0), as compared with the case when suddenly decreasing the assistance amount.

In a third aspect of the present invention, the control system for a hybrid vehicle further comprises a driver's intention determining device (S304, S308, S309) for determining that the driver's intention to accelerate the vehicle exceeds a predetermined standard, when a throttle opening is above a predetermined value and a variation in the throttle opening state is above a predetermined value.

When the accelerator pedal is depressed significantly and instantaneously, the driver's request of the assistance different from the normal assistance can be clearly detected. The variation in the degree of throttle opening may be replaced with a variation in the vehicle speed.

In a fourth aspect of the present invention, the assistance determining device comprises: a starting assistance determining device (S1251, S1258) for determine whether to perform starting assistance when starting the vehicle; a boost assistance determining device (S1307, S1310) for determining whether to perform boost assistance when in a gear-shift action; and a normal assistance determining device (S1124, S1135) for making the determination when the vehicle accelerates in a situation other than when starting the vehicle or in the gear-shift action. The first assistance amount determining device comprises a normal assistance amount determining device (S1029) for determining a normal assistance amount when the normal assistance determining device determines to perform the assisting function. The second assistance amount determining device comprises: a starting assistance amount determining device (S1274, S1276, S1277) for determining a starting assistance amount when the starting assistance determining device determines to perform the assist; and a boost assistance amount determining device (S1338) for determining a boost assistance amount when the boost assistance determining device determines to perform the assist. The assistance control device comprises: an assistance amount selector (S1005) for selecting one of the starting assistance amount (STRASTF), the boost assistance amount (SCRASTF), and the normal assistance amount (ACCASTF), when the assistance determining device determines at least one of the starting assist, the boost assist, and the normal assist; and an assistance controller for driving the motor to assist the output from the engine, based on the selected assistance amount.

In a fifth aspect of the present invention, the assistance amount selector selects the greatest one of the starting assistance amount, the boost assistance amount, and the normal assistance amount.

When the driver wishes to accelerates the vehicle, one of the starting assistance determining device, the boost assistance determining device, and the normal assistance determining device appropriately detects the intention of the driver. The starting assistance amount determining device, the boost assistance amount determining device, and the normal assistance amount determining device calculate the assistance amounts. The assistance amount selector selects the greatest one of the assistance amounts. Thus, the assistance can be performed effectively.

In a sixth aspect of the present invention, the starting assistance determining device determines whether to perform the assist, based on at least an engine speed (NE) and a vehicle speed (VP).

Thus, the presence or absence of the driver's intention to accelerate the vehicle can be accurately detected when starting the vehicle.

In a seventh aspect of the present invention, the starting assistance determining device determines whether to perform the assist, based on at least one of a throttle opening state (THEM) and an air intake passage pressure (PBG).

Thus, the degree of the acceleration requested by the driver can be detected when starting the vehicle.

In an eighth aspect of the present invention, the boost assistance determining device determines whether to perform the assist, based on a throttle opening state (THEM) and a variation (DTHEM) in the throttle opening state.

Thus, the presence or absence of the driver's intention to accelerate the vehicle can be accurately detected when in a shift-change action.

In a ninth aspect of the present invention, the boost assistance amount determining device sets the assistance amount, based on at least an engine speed (NEB).

Thus, the presence or absence of the driver's intention to accelerate the vehicle can be accurately detected when in a shift-change action.

DETAILED DESCRIPTION OF THE INVENTION

First Embodiment

Figure 1:
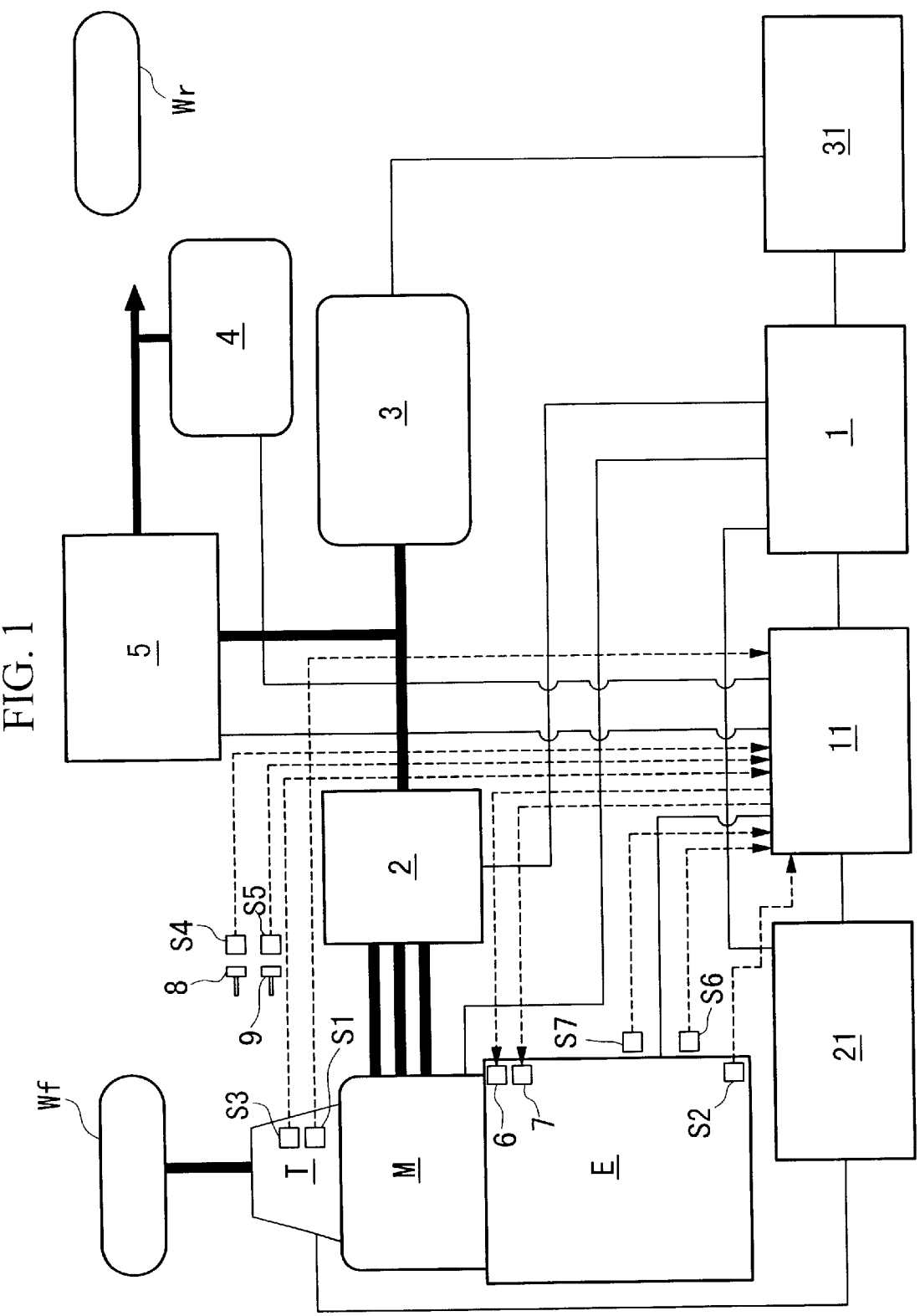
FIG. 1 is a diagram showing the entire construction of a hybrid vehicle of the present invention.

FIG. 1 shows the embodiment of the present invention applied to a parallel hybrid vehicle. Driving forces from both an engine E and a motor M are transmitted via a transmission T of a manual transmission, to front wheels Wf which are the drive wheels. When the hybrid vehicle decelerates and the driving force is transmitted from the front wheels Wf to the motor M, the motor M acts as a generator to generate so-called regenerative braking force, so that the kinetic energy of the vehicle body is stored as electric energy.

A power drive unit 2 performs the driving and regeneration of the motor M in response to control commands from a motor ECU 1. A high-voltage battery 3 for sending and receiving electric energy to and from the motor M is connected to the power drive unit 2. The battery 3 includes a number of modules connected in series, each module having a number of cells connected in series. The hybrid vehicle includes a 12-volt auxiliary battery 4 for driving various accessories. The auxiliary battery 4 is connected to the battery 3 via a downverter 5. The downverter 5, controlled by an FIECU 11, reduces the voltage from the battery 3 and charges the auxiliary battery 4.

The FIECU 11 controls, in addition to the motor ECU 1 and the downverter 5, a fuel supply amount controller 6 for controlling the amount of fuel supplied to the engine E, a starter motor 7, an ignition timing, etc. Therefore, the FIECU 11 receives a signal from a speed sensor $S_1$ for detecting the vehicle speed V based on the rotation of the driving shaft of the transmission, a signal from an engine rotational speed sensor $S_2$ for detecting the engine rotational speed NE, a signal from a shift position sensor $S_3$ for detecting the shift position of the transmission T, a signal from a brake switch $S_4$ for detecting operation of a brake pedal 8, a signal from a clutch switch $S_5$ for detecting operation of a clutch pedal 9, a signal from a throttle valve opening sensor $S_6$ for detecting the throttle opening state TH, and a signal from an air intake passage pressure sensor $S_7$ for detecting the air intake passage pressure PB. In FIG. 1, reference numeral 31 denotes a battery ECU for protecting the battery 3 and calculating the state of charge (remaining charge) SOC of the battery 3.

The control modes of the hybrid vehicle are "idle stop mode", "idle mode", "deceleration mode", "acceleration mode", and "cruise mode."

Figure 2:
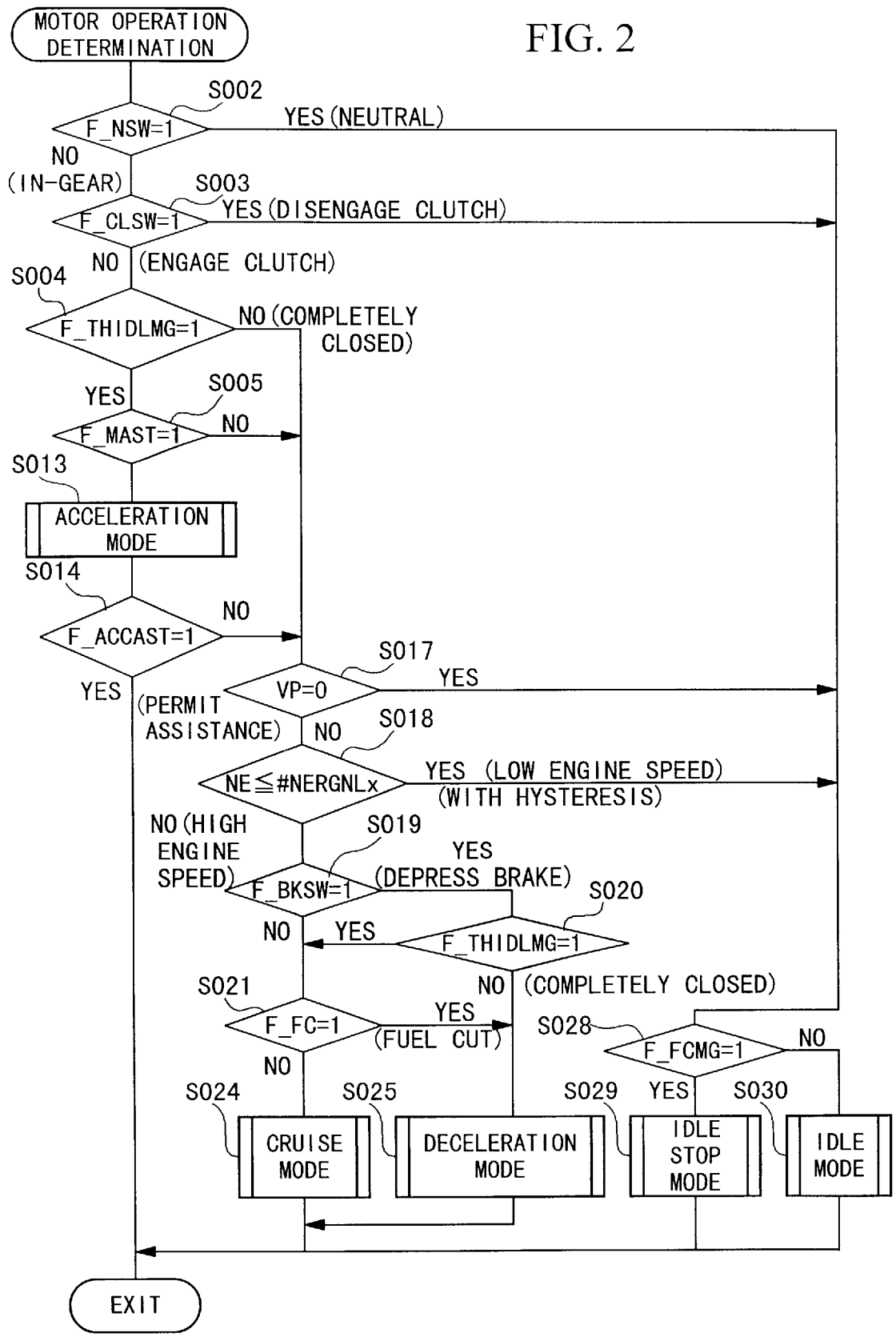
FIG. 2 is a flowchart showing the motor operation mode determination of the first embodiment of the present invention.

Referring to the flowchart of FIG. 2, the process for determining a motor operation mode will be explained.

In step S002, it is determined whether a neutral position determination flag F_NSW is 1 or not. When in step S002 the determination is YES, that is, when the shift gear is in the neutral position, the flow proceeds to step S028, and it is determined whether an engine stop control flag F_FCMG is 1 or not. When in step S028 the determination is NO, the flow proceeds to step S030, the vehicle enters idle mode, and the control terminates. In idle mode, the supply of the fuel is restarted after the fuel cut, and the engine E is maintained in an idling state. When in step S028 the determination is YES, the flow proceeds to step S029 where the vehicle then enters idle stop mode, and the control terminates. In idle stop mode, the engine is stopped under a predetermined condition.

When in step S002 the determination is NO, that is, when in the in-gear state, the flow proceeds to step S003, and it is then determined whether a clutch connection determination flag F_CLSW is 1 or not. When the determination is YES, that is, when the clutch is disconnected, the flow proceeds to step S028. When in step S003 the determination is NO, that is, when the clutch is connected, the flow proceeds to step S004.

In step S004, it is determined whether an IDLE determination flag F_THIDLMG is 1 or not. When this determination is NO, that is, when the throttle is completely closed, the flow proceeds to step S017. When in step S004 the determination is YES, that is, when the throttle is not completely closed, the flow proceeds to step S005, and it is then determined whether a motor assistance determination flag F_MAST is 1 or not.

When in step S005 the determination is NO, the flow proceeds to step S017. When in step S005 the determination is YES, the flow proceeds to acceleration mode in step S013. After entering acceleration mode in step S013, it is determined in step S014 whether an assistance permission flag F_ACCAST is 1 or not. When this determination is YES, the control terminates. When in step S014 the determination is NO, the flow proceeds to step S017.

In step S017, it is determined whether a vehicle speed VP for the engine control is 0 or not. When this determination is YES, that is, when the vehicle speed is 0, the flow proceeds to step S028. When in step S017 the determination is NO, that is, when the vehicle speed is not 0, the flow proceeds to step S018.

In step S018, the engine speed NE is compared with a cruse/deceleration mode lower limit engine speed #NERGNLx. Character "x" in #NERGNLx indicates a value set for each gear (which contains hysteresis).

As the result of the determination in step S018, when the engine speed NE≦the cruse/deceleration mode lower limit engine speed #NERGNLx, that is, when at a low engine speed, the flow proceeds to step S028. On the other hand, when NE>#NERGNLx, that is, when at a high engine speed, the flow proceeds to step S019.

In step S019, it is determined whether a brake ON determination flag F_BKSW is 1 or not. When in step S019 the determination is YES, that is, when a brake pedal is depressed, the flow proceeds to step S020. When in step S019 the determination is NO, that is, when the brake pedal is not depressed, the flow proceeds to step S021.

In step S020, it is determined whether an IDLE determination flag F_THIDLMG is 1 or not. When this determination is NO, that is, when the throttle is completely closed, the flow proceeds to deceleration mode in step S025, and the control terminates. In deceleration mode, the regenerative braking is performed by the motor M. When in step S020 the determination is YES, that is, when the throttle is not completely closed, the flow proceeds to step S021.

In step S021, it is determined whether a fuel cut execution flag F_FC is 1 or not. When this determination is YES, that is, when the fuel supply is stopped, the flow proceeds to S025. When in step S021 the determination is NO, the vehicle enters cruise mode in step S024, and the control terminates. In cruise mode, the motor M is not driven, and the vehicle travels by the driving force from the engine E.

[Zoning of the State of Charge (SOC)]

The zoning of the state of charge (also referred to as the "remaining charge" or SOC) (dividing the remaining charge into zones) will be explained. The calculation of the SOC is carried out by the battery ECU 31, based on, i.e., the voltage, the discharged current, or the temperature.

In this example, zone A (from 40% to 80 or 90% of the SOC), which is the normal use zone, is defined as the standard. Zone B (from 20% to 40% of the SOC), which is a temporary use zone, is below zone A, and zone C (from 0% to 20% of the SOC), which is an over-discharge zone, is below zone B. Zone D (from 80% or 90% to 100% of the SOC), which is an overcharge zone, is above zone A.

The SOC is calculated by integrating discharged current when in zones A and B, and is calculated based on voltages when in zones C and D, taking into consideration the characteristics of the battery.

The boundaries between zones have upper and lower threshold values. The threshold values when the SOC is increasing are chosen to differ from those when the SOC is decreasing so as to cause hysteresis.

When the SOC cannot be calculated because the battery 3 is exchanged and the SOC in the battery ECU 31 is reset, the initial SOC is assumed to be 20% which is at the boundary between zones C and D. To increase this assumed value by a predetermined amount (for example, approximately 20%), the vehicle mainly charges the battery as much as possible. Thus, when initially the actual SOC was in zone B, the SOC enters zone A. When initially the actual SOC was in zone A, the SOC remains in zone A, and, before the SOC enters zone D, the charging of the battery is stopped based on the present voltage. Then, the present SOC is detected.

[Assistance Trigger Determination]

Figure 3:
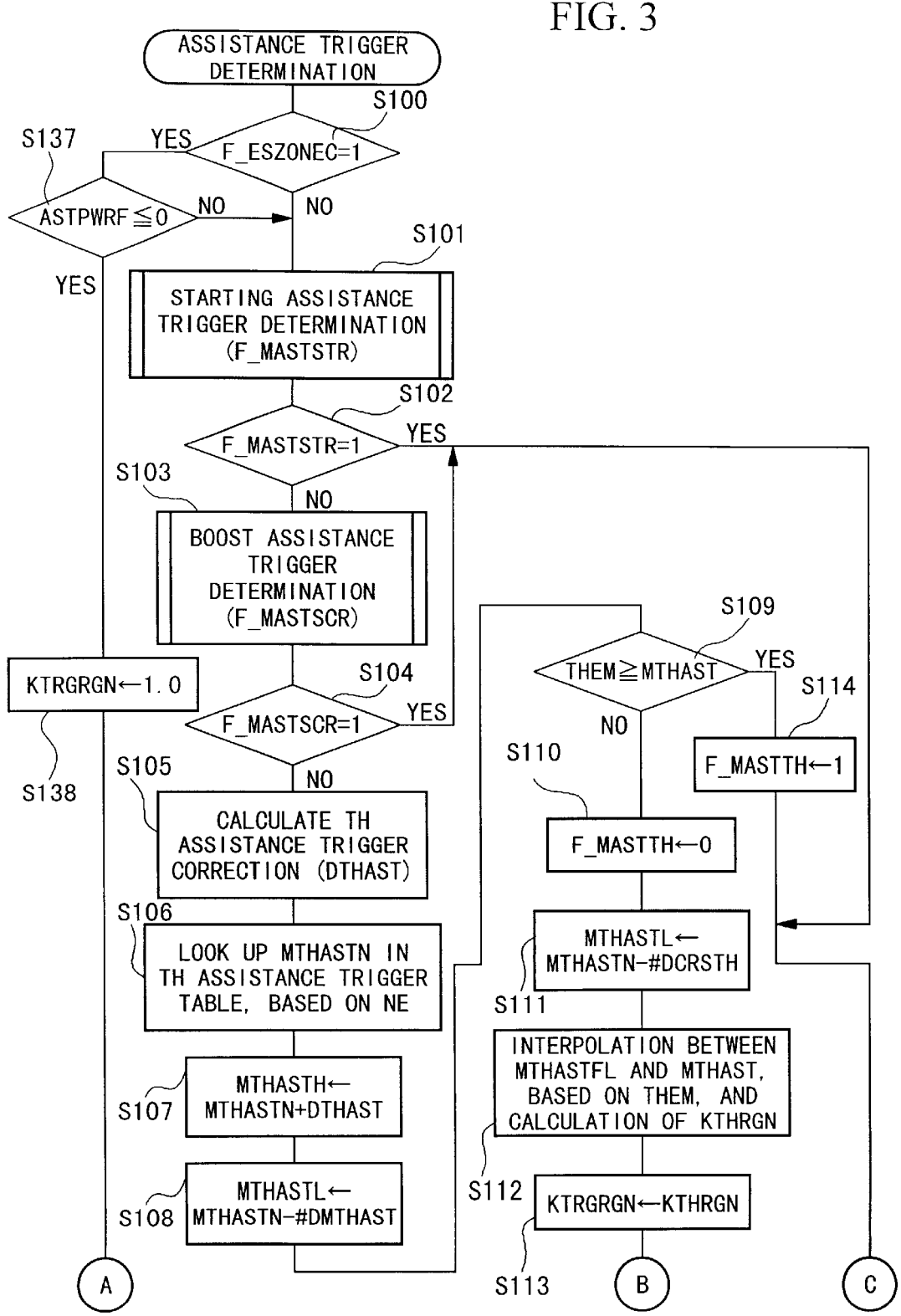
FIG. 3 is a flowchart showing the assistance trigger determination of the first embodiment of the present invention.
Figure 4:
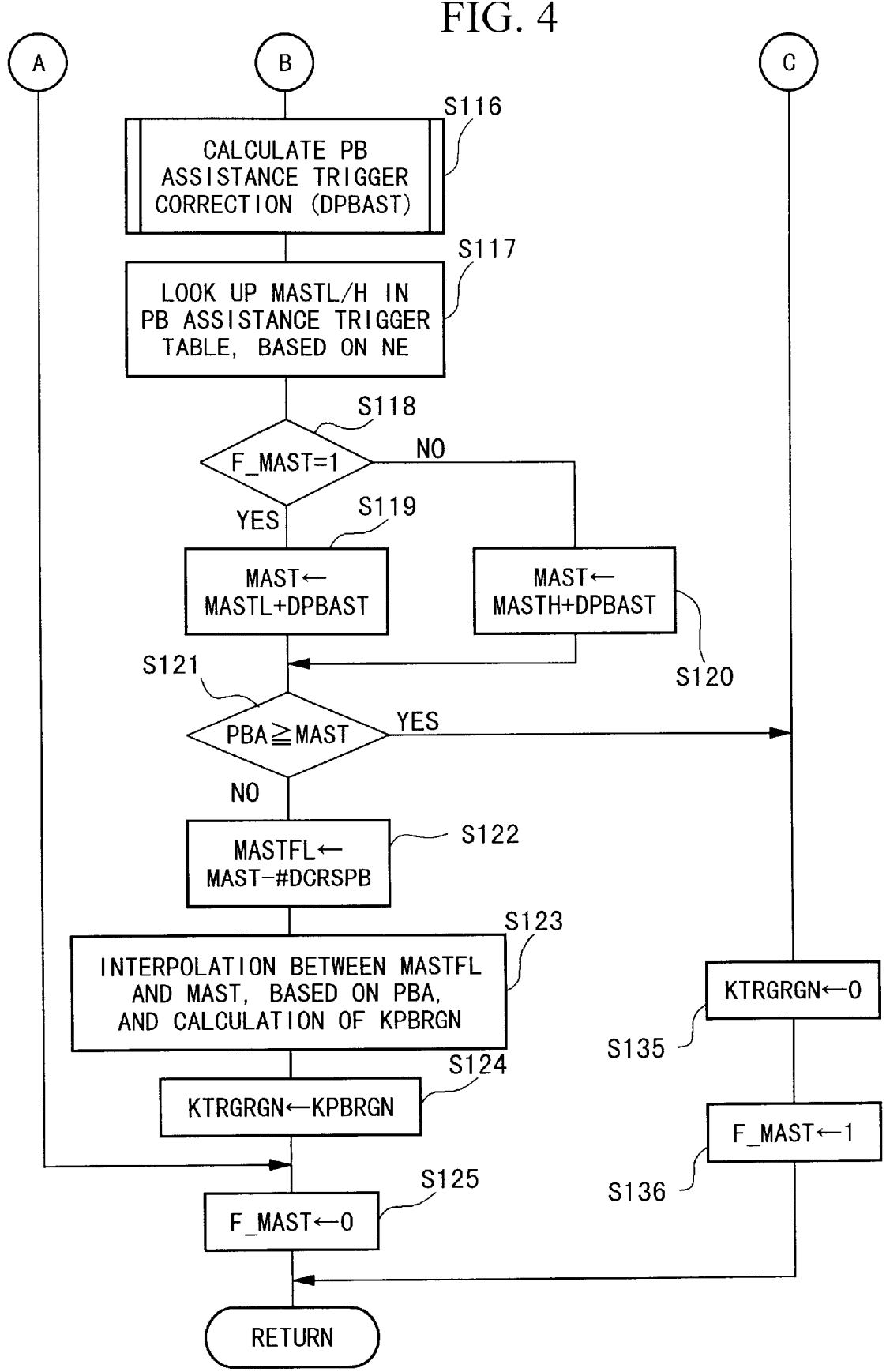
FIG. 4 is a flowchart showing the assistance trigger determination of the present invention.

FIGS. 3 and 4 are flowcharts showing assistance trigger determination, and more specifically, flowcharts showing the determination of assist/cruise mode based on zones.

In step S100, it is determined whether an energy storage zone C flag F_ESZONEC is 1 or not. When this determination is YES, that is, when the remaining battery charge SOC is in zone C, it is determined in step S137 whether a final assistance command value ASTPWRF is equal to or below 0. When in step S137 the determination is YES, that is, when the final assistance command value ASTOWRF is equal to or below 0, a cruise generation subtraction coefficient KTRGRGN is set to 1.0 in step S138, a motor assistance determination flag F_MAST is set to 0 in step S125, and the flow returns.

When in steps S100 and S137 the determination is NO, the starting assistance trigger determination is made in step S101. The object of this starting assistance trigger determination is to improve the starting performance. When an air intake passage pressure PB is high equal to or above a predetermined value, the assistance trigger value and the assistance amount are calculated differently from the normal assistance. As the results of the calculation, when the starting assistance control is required, a starting assistance request flag F_MASTSTR is set to 1.

Next, in step S102, it is determined whether the starting assistance request flag F_MASTSTR is 1 or not. When the flag is 1, the flow proceeds to step S135 to separate from the normal assistance determination, the cruise generation subtraction coefficient KTRGRGN is set to 0, the motor assistance determination flag F_MAST is set to 1 in step S136, and the flow returns.

When in step S102 the starting assistance request flag F_MASTSTR is not 1, the flow proceeds to a boost assistance (scramble assistance) trigger determination in step S103. This boost assistance trigger determination increases the assistance amount temporarily to improve the acceleration. Basically, when the variation in the operation of the throttle is increased, the flag is set to 1, and the detail of this process will be described later.

In step S104, it is determined whether the boost assistance request flag F_MASTSCR, which was set in the boost assistance trigger determination, is 1 or not. When this flag is 1, the flow proceeds to step S135 to separate from the assistance trigger determination.

When the boost assistance request flag F_MASTSCR is not 1, a throttle assistance trigger correction value DTHAST is calculated in step S105. The calculation of the correction value increases the assistance trigger threshold value when there is a load due to an air conditioner.

In step S106, a threshold value MTHASTN which is the standard for the throttle assistance trigger is looked up in a throttle assistance trigger table. The throttle assistance trigger table, as shown with the solid line in FIG. 5, defines the threshold value MTHASTN of the degree of throttle opening depending on the engine rotational speed NE. The threshold value MTHASTN is the standard for the determination of whether the motor assistance is performed.

Subsequently, in steps S107 and S108, the correction value DTHAST calculated in step S105 is added to the standard threshold value MTHASTN for the throttle assistance trigger obtained in step S106 to obtain an upper throttle assistance trigger threshold MTHASTH. A difference #DMTHAST for setting the hysteresis is extracted from the upper throttle assistance trigger threshold value MTHASTH to obtain a lower throttle assistance trigger threshold value MTHASTL. These upper and lower throttle assistance trigger threshold values are shown with the dashed lines in FIG. 5, overlapping the standard threshold value MTHASTN of the throttle assistance trigger table.

In step S109, it is determined whether the present value THEM indicating the opening state of the throttle is equal to or above the throttle assistance trigger threshold value MTHIAST calculated in steps S107 and S108. The throttle assistance trigger threshold value MTHAST, which includes the hysteresis mentioned above, refers to the upper throttle assistance trigger threshold value MTHASTH when the opening of the throttle is increased, and refers to the lower throttle assistance trigger threshold value MTHASTL when the opening of the throttle is decreased.

When in step S109 the determination is YES, that is, when the present value THEM of the opening of the throttle is equal to or above the throttle assistance trigger threshold value MTHAST (which has the upper and lower hysteresis), the flow proceeds to step S114. When in step S109 the determination is NO, that is, when the present value THEM of the opening of the throttle is not equal to or above the throttle assistance trigger threshold value MTHAST (which has the upper and lower hysteresis), the flow proceeds to step S110.

In step S114, the throttle motor assistance determination flag F_MASTTH is set to 1. In step S110, the throttle motor assistance determination flag F_MASTTH is set to 0.

In the above process, it is determined whether the motor assistance is required according to the throttle opening state TH. When in step S109 the present value THEM of the opening of the throttle is equal to or above the throttle assistance trigger threshold value MTHAST, the throttle motor assistance determination flag F_MASTTH is set to 1.

In the following acceleration mode, the flag is read and it is determined that the motor assistance is required.

When in step S110 the throttle motor assistance determination flag F_MASTTH is set to 0, this indicates that the vehicle is outside the zone in which the motor assistance determination is made based on the throttle opening state. The present invention performs the assistance trigger determination based on the throttle opening state TH or on the air intake passage pressure PB of the engine. When the present value THEM of the opening of the throttle is equal to or above the throttle assistance trigger threshold value MTHAST, the assistance determination is made based on the opening state TH of the throttle, while, when the present value THEM does not exceed the threshold value MTHAST, the determination is made based on the air intake passage pressure PB.

Figure 7:
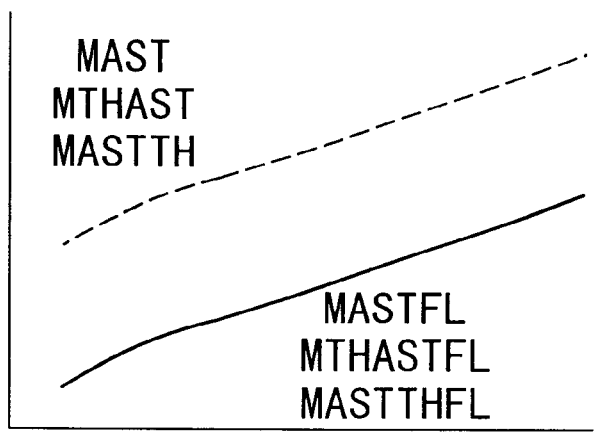
FIG. 7 is a graph for calculating coefficients in step S113, S124, and S134 of the present invention.
Figure 8:
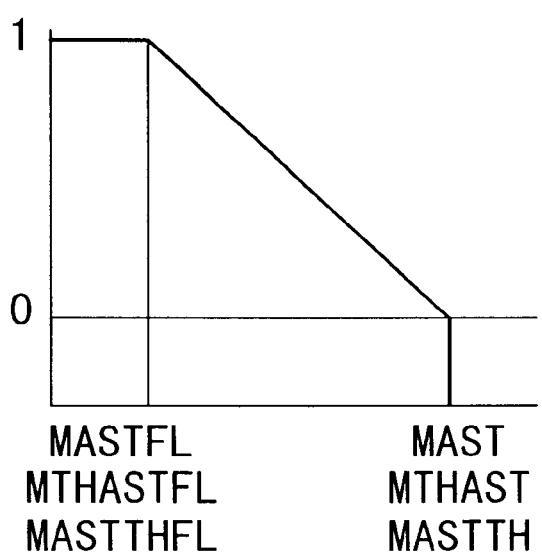
FIG. 8 is a graph for calculating coefficients in step S113, S124, and S134 of the present invention.

In step S111, as shown in FIG. 7, a predetermined delta value of the throttle opening state (e.g., 10 degrees) is subtracted from the throttle assistance trigger threshold value MTHAST to obtain a final throttle assistance trigger lower threshold value MTHASTFL. In the next step S112, as shown in FIG. 8, the threshold value is interpolated between MTHASTFL and MTHAST, based on the value THEM of the present degree of throttle opening, to obtain a cruise generation subtraction coefficient table value KTHRGN, and this KTHRGN is set as the cruise generation subtraction coefficient KTRGRGN.

In step S116, an air intake passage pressure correction value DPBAST is calculated. This value determines the increase in the assistance trigger threshold value when there is a load due to the air conditioner.

Figure 5:
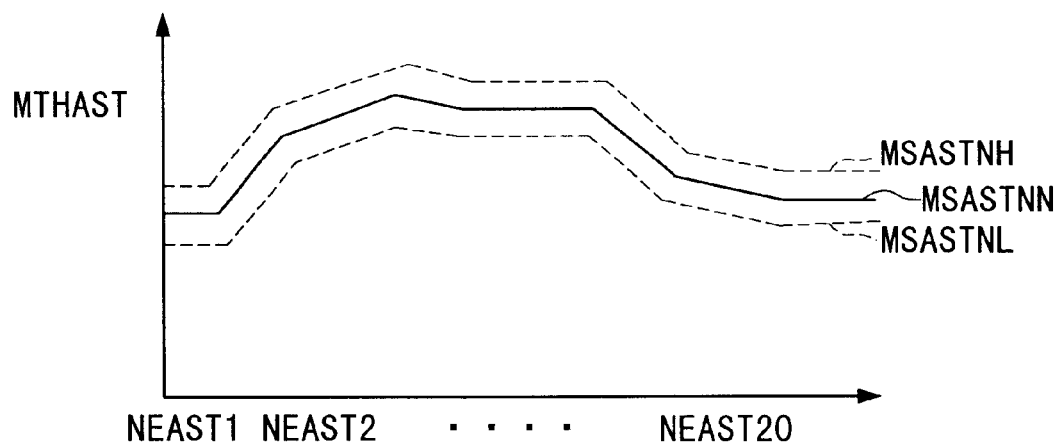
FIG. 5 is a graph showing the threshold values in TH assistance mode and PB assistance mode of the first embodiment of the present invention.

Subsequently, in step S117, a threshold value MASTL/H for the air intake passage pressure assistance trigger is looked up in an air intake passage pressure assistance trigger table. The air intake passage pressure assistance trigger table, as shown with the two solid lines in FIG. 6, defines an upper air intake passage pressure assistance trigger threshold value MASTH and a lower air intake passage pressure assistance trigger threshold value MASTL for determining whether the motor assistance is required depending on the engine rotational speed NE. In the process in step S117, when the air intake passage pressure PB, as it is increased or as the engine rotational speed NE is decreased, crosses the upper threshold value line MASTH from the lower area to the upper area in FIG. 6, the motor assistance determination flag F_MAST is switched from 0 to 1. When the air intake passage pressure PB, as it is decreased or as the engine rotational speed NE is increased, crosses the lower threshold value line MASTL from the upper area to the lower area, the motor assistance determination flag F_MAST is switched from 1 to 0. The process shown in FIG. 5 is changed depending on the stoichiometric or the lean-burn state.

In the next step S118, it is determined whether the motor assistance determination flag F_MAST is 1 or not. When this determination is 1, the flow proceeds to step S119. When the determination is not 1, the flow proceeds to step S120. In step S119, the air intake passage pressure lower threshold value MASTL calculated in step S117 and the correction value DPBAST calculated in step S116 are added to thereby obtain an air intake passage assistance trigger threshold value MAST. In step S121, it is determined whether the present air intake passage pressure PBA is equal to or above MAST obtained in step S119. When this determination is YES, the flow proceeds to step S135. When the determination is NO, the flow proceeds to step S122. In step S120, the air intake passage assistance trigger upper threshold value MASTH looked up in step S117 and the correction value DPBAST calculated in step S116 are added to thereby obtain the air intake assistance trigger threshold value MAST, and the flow proceeds to step S121.

In step S122, as shown in FIG. 7, a predetermined air intake passage pressure delta value #DCRSPB (e.g., 100 mg) is subtracted from the air intake passage pressure assistance trigger threshold value MAST, to thereby obtain a final air intake passage pressure lower threshold value MASTFL. Then, in step S123, as shown in FIG. 7, the threshold value is interpolated between MASTFL and MAST, based on the present air intake passage pressure PBA, to thereby obtain a cruise generation subtraction coefficient KPBRGN. In step S124, this KPBRGN is set as the cruise generation subtraction coefficient KTRGRGN. In step S125, the motor assistance determination flag F_MAST is set to 0, and the flow returns.

[Acceleration Mode]

Next, the acceleration mode will be explained with reference to the flowchart of FIGS. 9 and 10.

Initially, in step S200, it is determined whether the acceleration mode is selected. When this determination is YES, that is, when the acceleration mode is selected, the final assistance command value ASTPWRF is set as the acceleration assistance final calculation value ACCASTF in step S202, and the flow proceeds to step S203. When in step S200 the determination is NO, that is, when the vehicle is in mode other than acceleration mode, the acceleration assistance final calculation value ACCASTF is set to 0, and the flow proceeds to step S203. In step S203, the vehicle is set to acceleration mode, and the flow proceeds to step S204.

Figure 11:
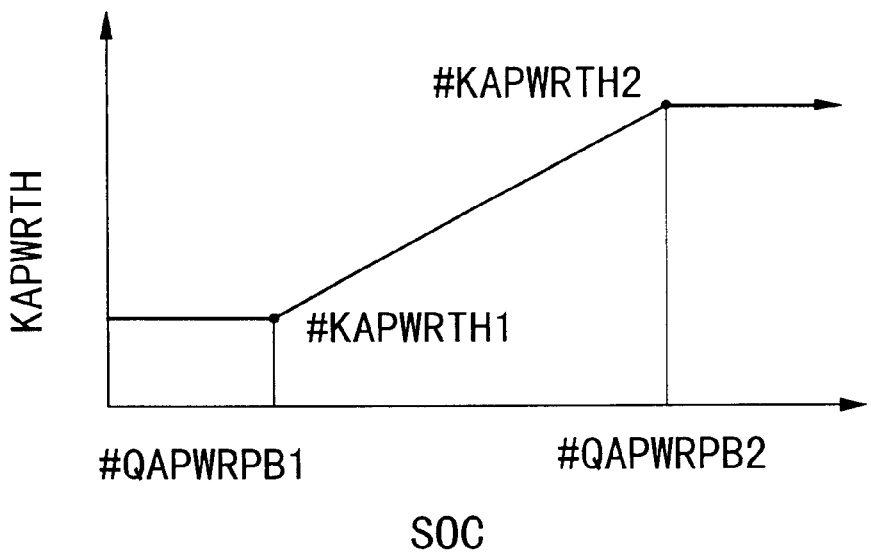
FIG. 11 is a graph for calculating a TH assistance amount coefficient of the present invention.
Figure 12:
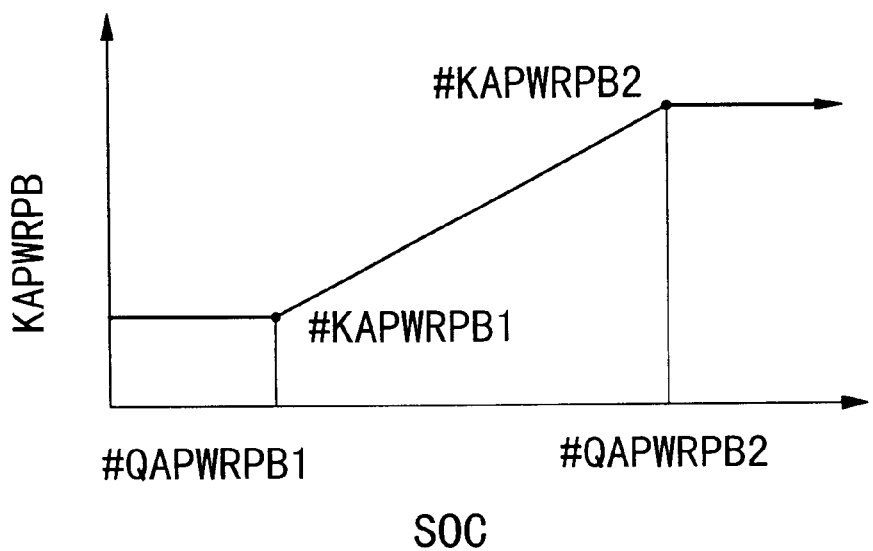
FIG. 12 is a graph for calculating a PB assistance amount coefficient of the present invention.

In step S204, as shown in FIG. 11, a throttle assistance amount coefficient KAPWRTH is looked up in a table, depending on the remaining battery charge SOC. In the next step S205, as shown in FIG. 12, an air intake passage pressure assistance amount coefficient KAPWRPB is looked up in a table, depending on the remaining battery charge SOC. Then, the flow proceeds to step S206.

Figure 13:
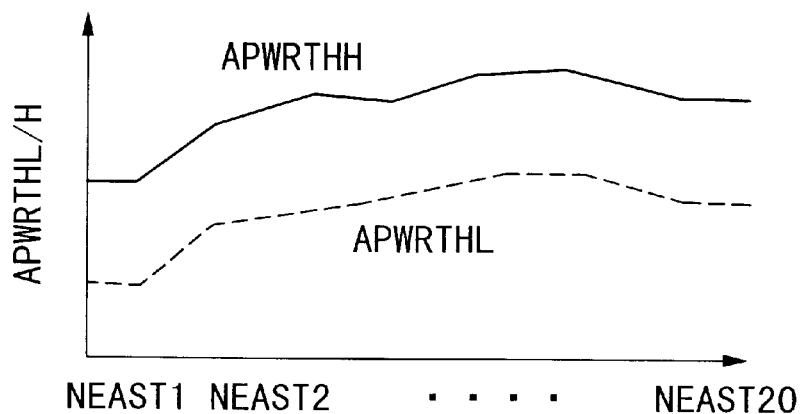
FIG. 13 is a graph for calculating upper and lower throttle assistance amount threshold values of the present invention.

In step S206, it is determined whether the throttle motor assistance determination flag F_MASTTH is 1 or not. When the determination is YES, that is, when the vehicle is in throttle assistance zone, the flow proceeds to step S207, where it is then determined whether the energy storage zone B flag F_ESZONEB is 1 or not. When this determination is NO, that is, when the remaining battery charge SOC is in zone other than zone B, the throttle assistance amount coefficient KAPWRTH is set to 1 in step S208, and the flow proceeds to step S209. When in step S207 the determination is YES, the flow proceeds to step S209. In step S209, as shown in FIG. 13, an upper throttle assistance amount threshold value APWRTHH and a lower throttle assistance amount threshold value APRWTHL are set, depending on, the engine speed NE. Between these values, there is a regular difference, depending on the engine speed NE.

Figure 14:
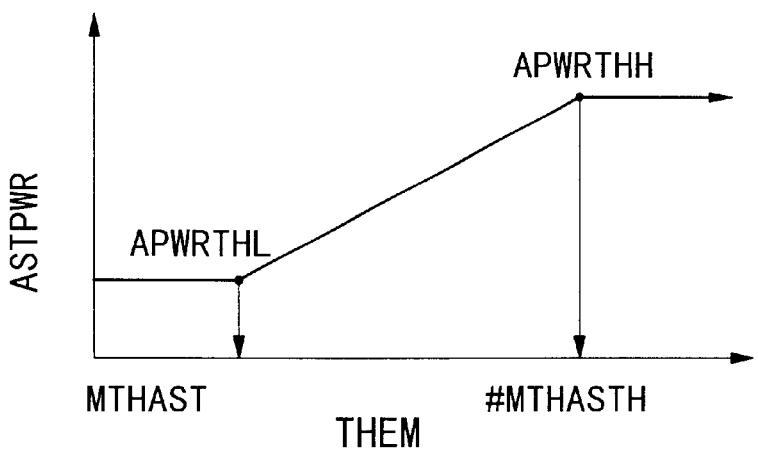
FIG. 14 is a graph for calculating an acceleration assistance calculation value of the present invention.

The flow proceeds to step S210, and then an acceleration assistance calculation value ACCAST is obtained. This acceleration assistance calculation value ACCAST can be obtained as shown in FIG. 14. In FIG. 14, as the throttle opening state varies from the throttle assistance trigger threshold value MTHAST to an opening state #MTHASTH of the throttle TH by a predetermined opening amount (e.g., an opening degree based on a function of the engine rotational speed NE), the assistance amount is interpolated between the upper throttle assistance amount threshold value APWRTHH and the lower throttle assistance amount threshold value APWRTHL which are set in step S209.

In step S211, the acceleration assistance calculation value ACCAST is multiplied by the throttle assistance amount coefficient KAPWRTH, and the flow proceeds to step S214.

When in step S206 the determination is NO, that is, when the vehicle is in air intake passage pressure assistance zone, the flow proceeds to step S212, and the assistance amount is looked up in a map, not shown, depending on the engine speed NE and the air intake passage pressure PB, and the map value #ASTPWR is set as the acceleration assistance calculation value ACCAST. In step S213, the acceleration assistance calculation value ACCAST is multiplied by the air intake passage pressure assistance amount coefficient KAPWRPB, and the flow proceeds to step S214. The map value #ASTPWR is changed, depending on the selected gear of the MT (manual transmission) vehicle, and is changed depending on the stoichiometric or the lean-burn state.

In step S214, it is determined whether the vehicle speed VP is equal to or above a high speed assistance cut determination speed #VACCAST or not. When this determination is YES, that is, when VP≧#VACCAST (e.g., more than 180 km/h), the flow proceeds to step S220, and it is determined whether the assistance permission flag F_ACCAST is 1 or not. When this determination is NO, that is, when the assistance permission flag F_ACCASTF is 0, the flow proceeds to step S225, and the acceleration assistance final calculation value ACCASTF is set to 0, the assistance permission flag F_ACCAST is set to 0 in step S226, and the flow proceeds to step S236.

When in step S220 the determination is YES, that is, when the assistance permission flag F_ACCAST is 1, it is determined in step S221 whether the previous mode was acceleration mode or not. When this determination is NO, that is, when the previous mode was not acceleration mode, the flow proceeds to step S225. When in step S221 the determination is YES, that is, when the previous mode is acceleration mode, the flow proceeds to step S222, in which it is then determined whether a timer TACCATC for gradually decreasing and updating DACCATC is 0 or not. When the timer TACCATC is not 0, the flow proceeds to step S235. When in step S222 the timer TACCATC is 0, the flow proceeds to step S223.

In step S223, the timer TACCATC for gradually decreasing and updating DACCATC is set to a timer value #TMACCATC. In step S224, a gradual subtractive value #DACCATC is repeatedly subtracted from the acceleration assistance final calculation value ACCASTF. In step S224A, it is determined whether ACCASTF is 0 or not. When it is equal to or below 0, the flow proceeds to step S225. When ACCASTF is above 0, the flow proceeds to step S235.

When in step S214 the determination is NO, that is, when the vehicle speed VP for the control of the engine<the high speed assistance cut determination vehicle speed #VACCAST (the vehicle is traveling at a high speed), the flow proceeds to step S215, and the starting assistance amount is then calculated. The object of the calculation of the starting assistance amount is to improve the starting performance. When an air intake passage pressure PB is high equal to or above a predetermined value at the starting of the vehicle, the assistance amount is calculated differently from the normal assistance amount. In step S216, it is determined whether the starting assistance permission flag F_STRAST is 1 or not. When the determination is YES, that is, when the starting assistance is permitted, the flow returns.

When in step S216 the determination is NO, that is, when the starting assistance is not permitted, the flow proceeds to step S217, and the boost assistance calculation process is performed. The contents of this process will be described later. In step S218, it is determined whether a boost assistance permission flag F_SCRAST is 1 or not. When this determination is YES, that is, when the boost assistance is permitted, the flow returns. When in step S218 the determination is NO, that is, when the boost assistance is not permitted, the flow proceeds to step S219, and it is then determined whether an energy storage zone C flag F_ESZONEC is 1 or not.

When in step S219 the determination is YES, that is, when the remaining battery charge SOC is in zone C, the flow proceeds to step S220. When in step S219 the determination is NO, the flow proceeds to step S227, and it is then determined whether a gradual additional/subtractive updating timer TACCAST is 0 or not. When the timer TACCAST is not 0, the flow proceeds to step S235. When in step S227 the timer TACCAST is 0, the flow proceeds to step S228.

In step S228, a timer value #TMACCAST is set as the timer TACCAST for gradual addition or subtraction. In step S229, it is determined whether the acceleration assistance calculation value ACCAST is equal to or above the acceleration assistance final calculation value ACCASTF or not. When in step S229 the determination is YES, that is, when ACCAST≧ACCASTF, a gradual additional value #DACCASTP is added to the acceleration assistance final calculation value ACCASTF in step S232, and it is determined in step S233 whether the acceleration assistance final calculation value ACCASTF is equal to or below the acceleration assistance calculation value ACCAST or not.

When in step S233 the determination is YES, that is, when ACCASTF≦ACCAST, the assistance permission flag F_ACCAST is set to 1 in step S235, and the flow proceeds to step S236. When in step S233 the determination is NO, that is, when ACCASTF>ACCAST, the acceleration assistance calculation value ACCAST is set as the acceleration assistance final calculation value ACCASTF in step S234, and the flow proceeds to step S235.

When in step S229 the determination is NO, that is, when the acceleration assistance calculation value ACCAST<the acceleration assistance final calculation value ACCASTF, the gradual subtractive value #DACCASTM (e.g., 0.3 W) is subtracted from ACCASTF in step S230, and it is determined in step S231 whether ACCASTF is equal to or above ACCAST.

When in step S231 the determination is YES, that is, when the acceleration assistance final calculation value ACCASTF≧the acceleration assistance calculation value ACCAST, the flow proceeds to step S235. When in step S231 the determination is NO, that is, when ACCASTF<ACCAST, the flow proceeds to step S234.

Figure 15:
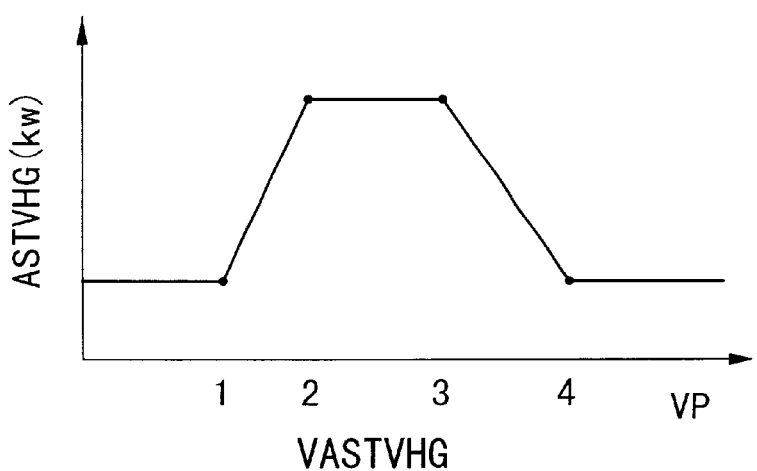
FIG. 15 is a graph for calculating an assistance amount upper limit value of the first embodiment of the present invention.

In step S236, as shown in FIG. 15, an assistance amount upper limit value ASTVHG is looked up in a table of an assistance amount upper limit value #ASTVHG, based on the vehicle speed VP. In the next step S237, it is determined whether the acceleration assistance final calculation value ACCASTF is equal to or above the assistance amount upper limit value ASTVHG. When this determination is YES, that is, when ACCASTF≧ASTVHG, ACCASTF is set to ASTVHG in step S238, and the flow proceeds to step S239. When in step S237 ACCASTF<ASTVHG, the flow proceeds to step S239. The final assistance command value ASTPWRF is set to ACCASTF in step S239, a final charge command value REGENF is set to 0 in step S240, and the control terminates.

[Boost Assistance Calculation Process]

Figure 16:
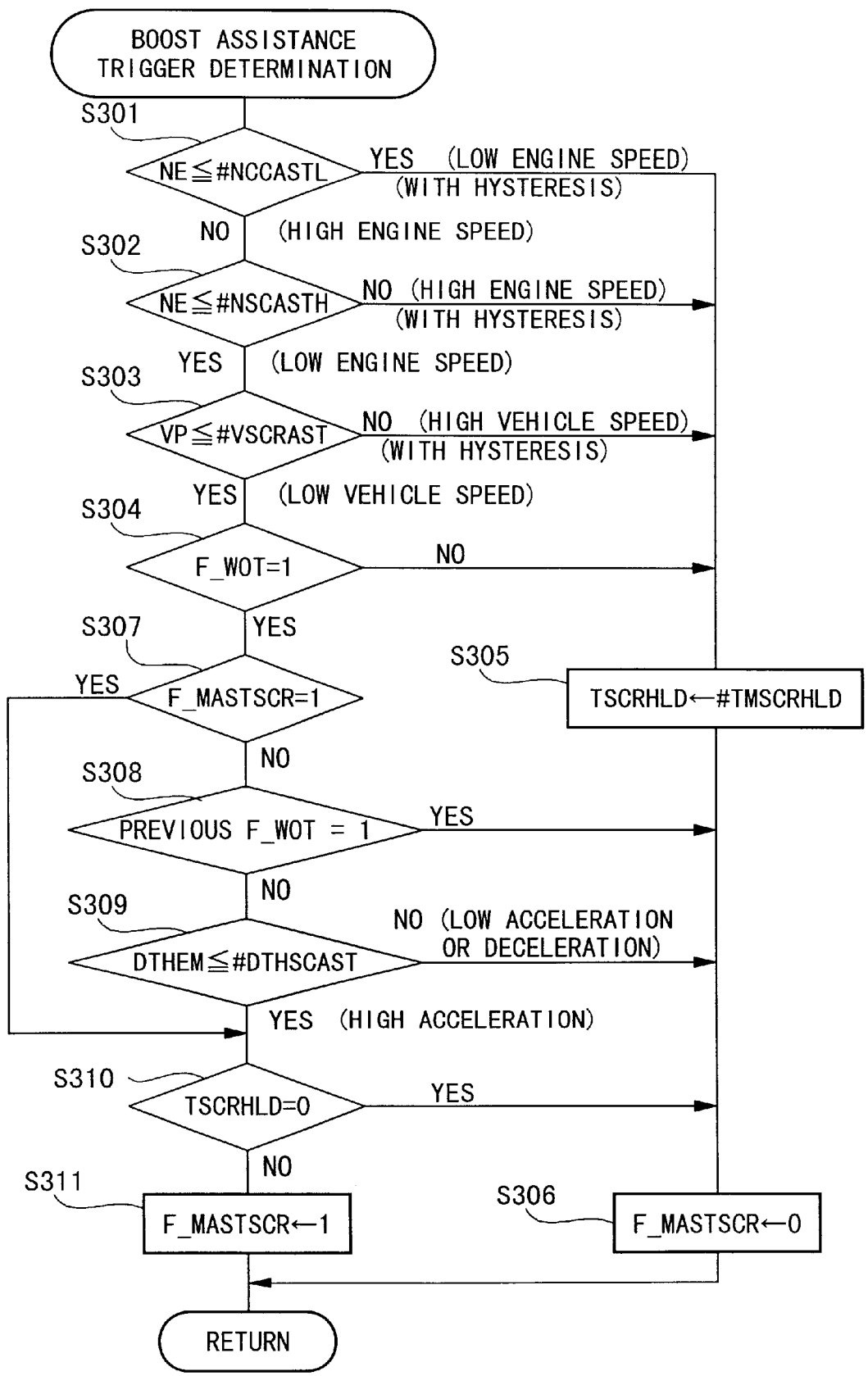
FIG. 16 is a flowchart showing the boost assistance trigger determination of the first embodiment of the present invention.
Figure 17:
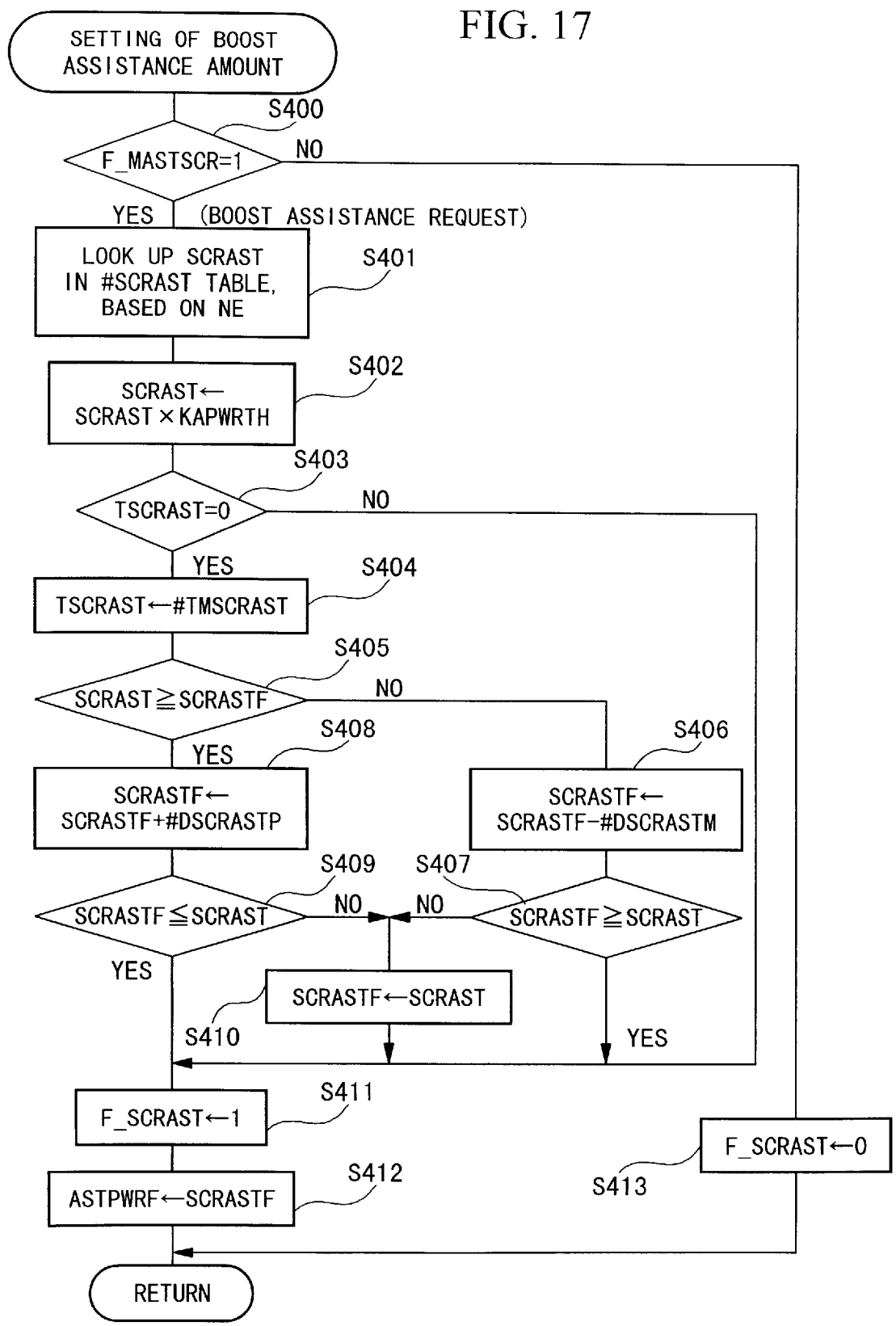
FIG. 17 is a flowchart for determining the assistance amount for the boost assistance trigger of the first embodiment of the present invention.

Next, the boost assistance calculation process in step S217 will be explained. The boost assistance process increases the assistance amount temporarily under a predetermined condition when the vehicle accelerates, to improve the acceleration performance. FIG. 16 is a flowchart showing the boost assistance trigger determination, and FIG. 17 is a flowchart for determining the assistance amount.

In step S301 in FIG. 16, it is determined whether the engine speed NE is equal to or below a boost assistance execution lower value #NSCASTL or not.

The boost assistance execution lower limit value #NSCASTL has hysteresis so that #NSCASTL is, e.g., 1000 rpm when the engine speed increases, and is 800 rpm when it decreases.

When in step S301 the engine speed NE is comparatively low and is equal to or below the boost assistance execution lower value #NSCASTL, the flow separates from this process, and proceeds to step S305. Then, in step S305, a timer TSCRHLD is set to a predetermined value "TMSCRHLD (e.g., 3 sec), a boost assistance request flag F_MASTSCR is set to 0 in step S306, and the flow returns.

When in step S301 the engine speed NE is comparatively high and is above the boost assistance execution lower limit value #NSCASTL, the flow proceeds to step S302, and it is then determined whether the engine speed NE is equal to or below the boost assistance execution upper limit value #NSCASTH or not. The boost assistance execution upper limit value #NSCASTH has hysteresis so that #NSCASTH is, e.g., 4200 rpm when the engine speed increases, and is 4000 rpm when it decreases.

When in step S302 the engine speed NE is comparatively high and is above the boost assistance execution upper limit value #NSCASTH, the flow separates from the process, and proceeds to step S305. When in step S302 NE is comparatively low and is equal to or below #NSCASTH, the flow proceeds to the next step S303.

In step S303, it is determined whether the vehicle speed VP is equal to or below the boost assistance execution upper speed #VSCRAST or not. In a manner similar to the engine speed, the upper speed has hysteresis so that #NSCASTH is, e.g., 150 km/h when the vehicle speed increases, and is 140 km/h when it decreases.

When in step S303 the vehicle speed VP is comparatively high and is above the boost assistance execution upper speed #VSCRAST, the flow separates from this process, and the flow proceeds to step S305. When in step S303 VP is equal to or below #VSCRAST, the flow proceeds to the next step S304.

The process in steps S300 to S304 restricts the execution of the boost assistance within the specified ranges of the engine speed NE and the vehicle speed VP. The boost assistance control compensates the decrease in the driving force when the gear is shifted, and improves the output response from the engine in medium load zone. Therefore, in steps S300 to S304, the flow separates from the boost assistance trigger determination.

In the next step S304, it is determined whether a throttle completely-open flag F_WOT is 1 or not. When determined that the degree of throttle opening is not high, the flow separates from this process, and proceeds to step S305. When the degree of throttle opening is high, the flow proceeds to step S307. While the degree of throttle opening is detected in step S304 to estimate the intention of the driver to accelerate the vehicle, a threshold value may be preset, and the flag may be set when the degree of throttle opening exceeds the threshold value.

In step S307, it is determined whether the boost assistance request flag F_MASTSCR, which is set in step S311 described later, is 1 or not.

When in step S307 the determination is NO, it is determined in step S308 whether the throttle completely-open flag F_WOT which was set in the previous cycle is 1 or not. That is, when in step S304 the throttle completely-open flag F_WOT was set to 1, it is determined whether this value is maintained in this cycle or not. When the throttle completely-open flag F_WOT has been 1, the vehicle is, e.g., driving up a slope while maintaining the throttle open, and the flow separates from this process, and proceeds to step S306.

When in step S308 the throttle completely-open flag F_WOT which was set in the previous cycle is not 1, that is, when the throttle is completely opened in this cycle, since the driver has the intention to accelerate the vehicle, the flow proceeds to step S309, and it is then determined whether a variation in the degree of throttle opening DTHEM is equal to or above a boost assistance determination threshold value #DTHSCAST (e.g., 1 degree) or not. When in step S309 the determination is NO, that is, when acceleration which the driver requests is low, or the vehicle is decelerating, the flow separates from this process, and proceeds to step S306. When in step S309 the determination is YES, the flow proceeds to step S310 because the acceleration requested by the driver is high.

In step S310, it is determined whether a timer TSCRHLD is 0 or not. When it is not 0, a boost assistance request flag F_MASTSCR is set to 1 in the next step S311. On the other hand, when the timer TSCRHLD is 0, the flow proceeds to step S306 to terminate this process. While this embodiment refers to the degree of throttle opening to recognize the driver's intention to accelerate the vehicle, the depression of the accelerator may be referred.

Figure 18:
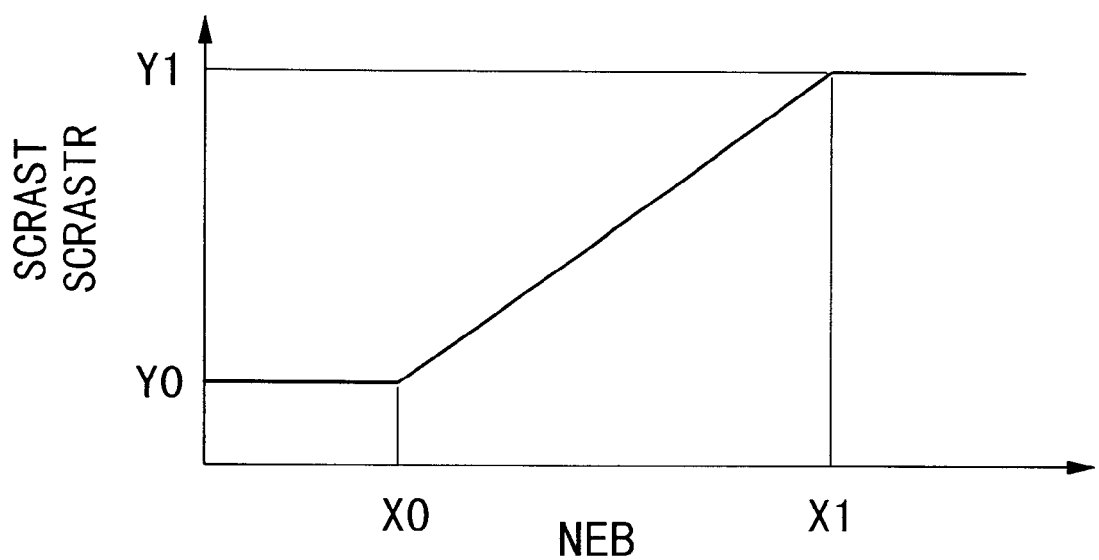
FIG. 18 is a graph showing the relationship between a vehicle speed and an acceleration in the present invention.

And In step S400 in FIG. 17, it is determined whether the boost assistance request flag F_MASTSCR is 1 or not. When this determination is NO, that is, when the boost assistance request flag F_MASTSCR is 0, a boost assistance permission flag F_SCRAST is set to 0 in step S413, and the flow returns. When in step S400 the determination is YES, that is, when the boost assistance request flag F_MASTSCR is 1, the flow proceeds to step S401, and an assistance value #SCRAST is looked up, depending on the engine speed NE, as shown in FIG. 18, and is set as a boost assistance calculation value SCRAST. The boost assistance value is changed depending on the respective gears.

In step S402, the boost assistance calculation value SCRAST is multiplied by the throttle assistance amount coefficient KAPWRTH. In step S403, it is determined whether a gradual additional/subtractive updating timer TSCRAST is 0 or not. When this determination is NO, the flow proceeds to step S411. When in step S403 the determination is YES, the flow proceeds to step S404, and the gradual additional/subtractive updating timer TSCRAST is set to a predetermined value #TMSCRAST, e.g., 50 ms.

In step S405, it is determined whether the boost assistance calculation value SCRAST is equal to or above the boost assistance final calculation value SCRASTF or not. When the determination is YES, that is, when SCRAST≧SCRASTF, a gradual additional value #DSCRASTP (e.g., 1 kw) is added to SCRASTF in step S408, and it is determined in step S409 whether SCRASTF is equal to or below SCRAST or not.

When in step S409 the determination is YES, that is, when the boost assistance final calculation value SCRASTF≦the boost assistance calculation value SCRAST, the boost assistance permission flag F_SCRAST is set to 1 in step S411, the final assistance command value ASTPWRF is set to the boost assistance final calculation value SCRASTF in step S412, and the flow returns. The boost assistance final calculation value SCRASTF is approximately 1.5 times of the normal assistance amount.

When in step S409 the determination is NO, that is, when the boost assistance final calculation value SCRASTF>the boost assistance calculation value SCRAST, SCRASTF is set to SCRAST in step S410, and the flow proceeds to step S411.

When in step S405 the determination is NO, that is, when SCRAST<SCRASTF, a gradual subtractive value #DSCRASTM (e.g., 500 w) is subtracted from SCRASTF, and it is determined in step S407 whether SCRASTF is equal to or above SCRAST or not.

When in step S407 the determination is YES, that is, when the boost assistance final calculation value SCRASTF≧the boost assistance calculation value SCRAST, the flow proceeds to step S411. When in step S407 the determination is NO, that is, when SCRASTF<SCRAST, the flow proceeds to step S410.

For example, when the driver changes the first gear to the second gear, or from the second gear to the third gear, the conventional vehicle with the high ratio gears may reduce the output. In this invention, when the predetermined conditions (steps S300 to S303) shown in FIG. 16 are met and the driver depresses the accelerator pedal (step S304), the boost assistance request flag F_MASTSCR has been set (in step S306) during the operation of the timer set in step S305.

Figure 19:
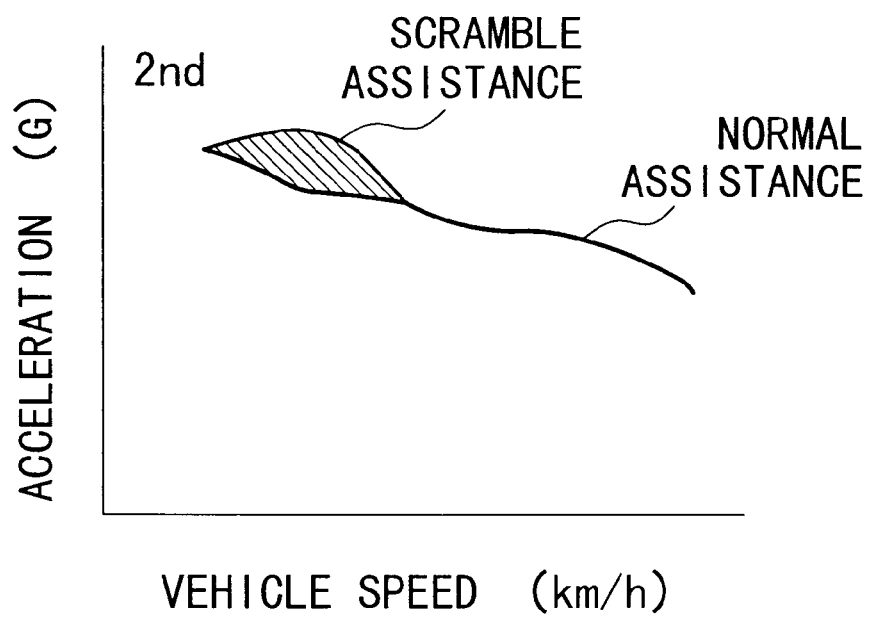
FIG. 19 is a graph showing the relationship between a vehicle speed and a shaft output in the first embodiment of the present invention.
Figure 20:
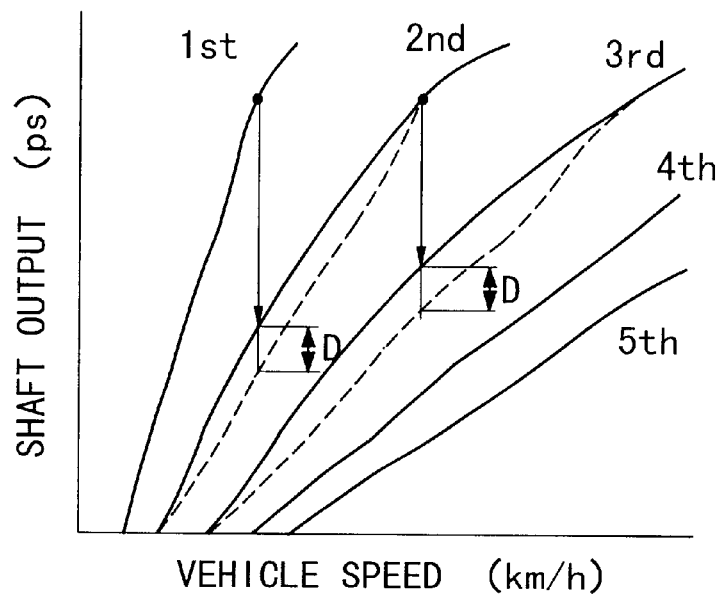
FIG. 20 is a graph showing the relationship between time and a boost assistance amount in the first embodiment of the present invention.

As the results, the increased assistance is performed (step S412) as shown in FIG. 17. As shown with the oblique lines in FIG. 19, when the second gear is selected, the acceleration (G) is increased. Therefore, the vehicle accelerates according to the driver's intention. As shown in FIG. 20, because the gear ratios are high, the present invention prevents the decrease D in the engine speed NE at the time of a shift change after the vehicle travels using the low gear (the first or second gear), and improves the acceleration when driving the vehicle. In FIG. 20, the dashed lines indicates the operations of the conventional vehicle.

Figure 21:
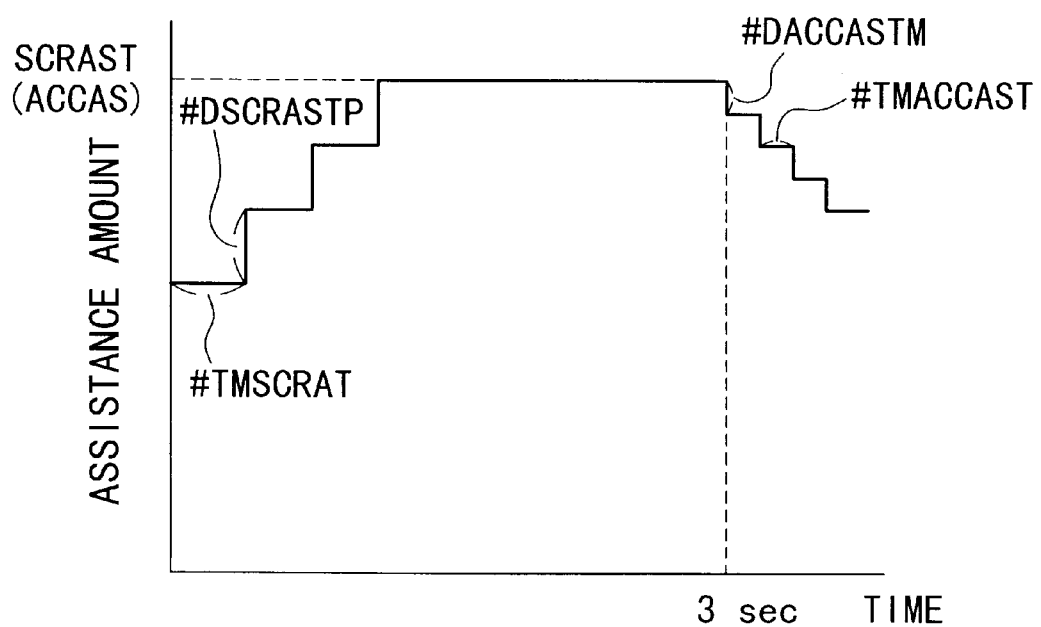
FIG. 21 is a graph showing the gradual increase and decrease in the assistance amount according to the boost assistance in the first embodiment of the present invention.

Even when performing the boost assist, the driver does not feel uneasy and the torque assistance is smoothly performed because the assisting output is gradually increased in steps S405, S408, S409, and S411 (which corresponds to the first half of the graph of FIG. 21). When the time set in step S305 has passed and the timer becomes 0 in step S310, the boost assistance request flag F_MASTSCR is reset in step S306, the determination in step is made in step S400, and the boost assistance permission flag F_SCRAST is reset in step S413.

Figure 9:
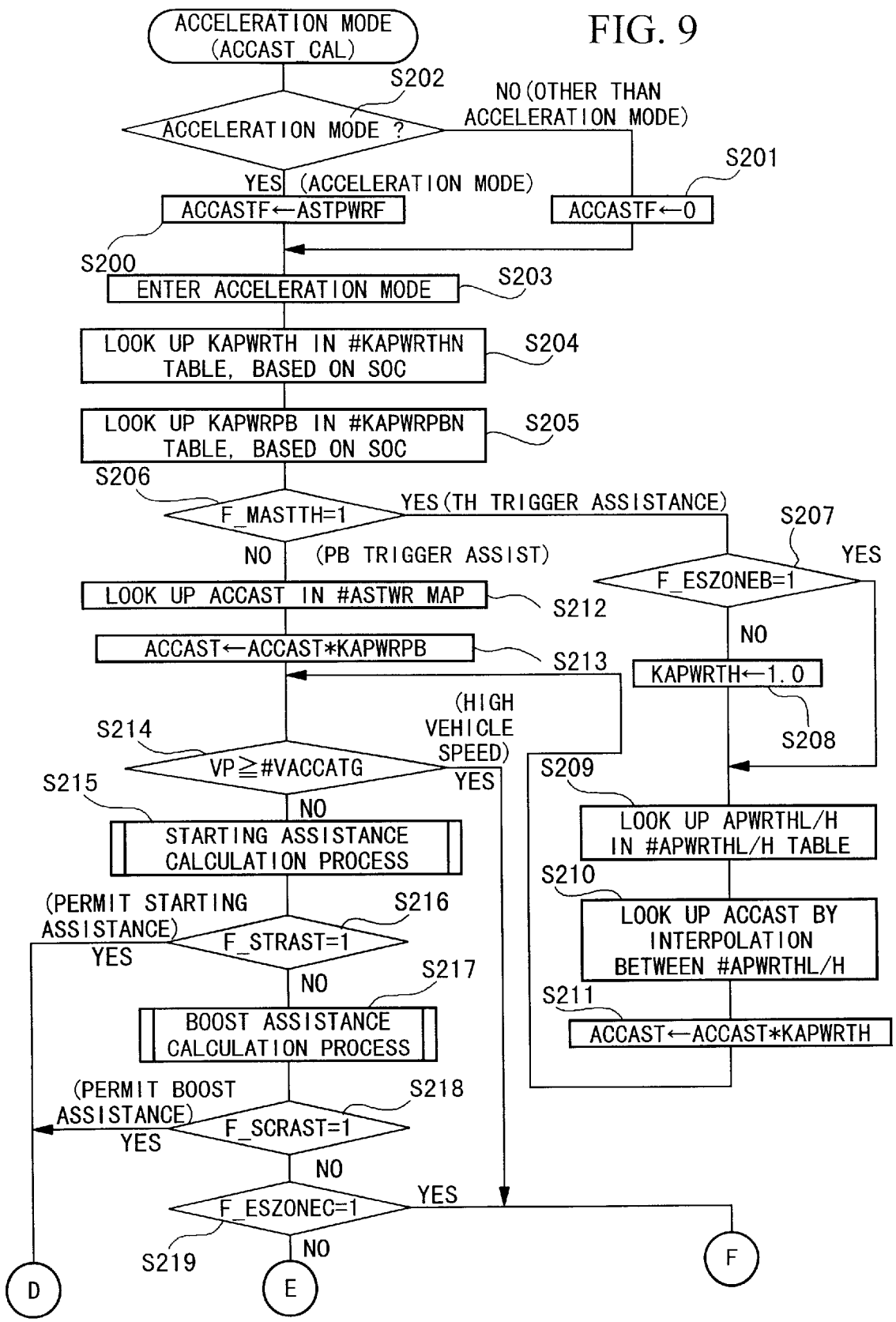
FIG. 9 is a flowchart showing acceleration mode of the first embodiment of the present invention.
Figure 10:
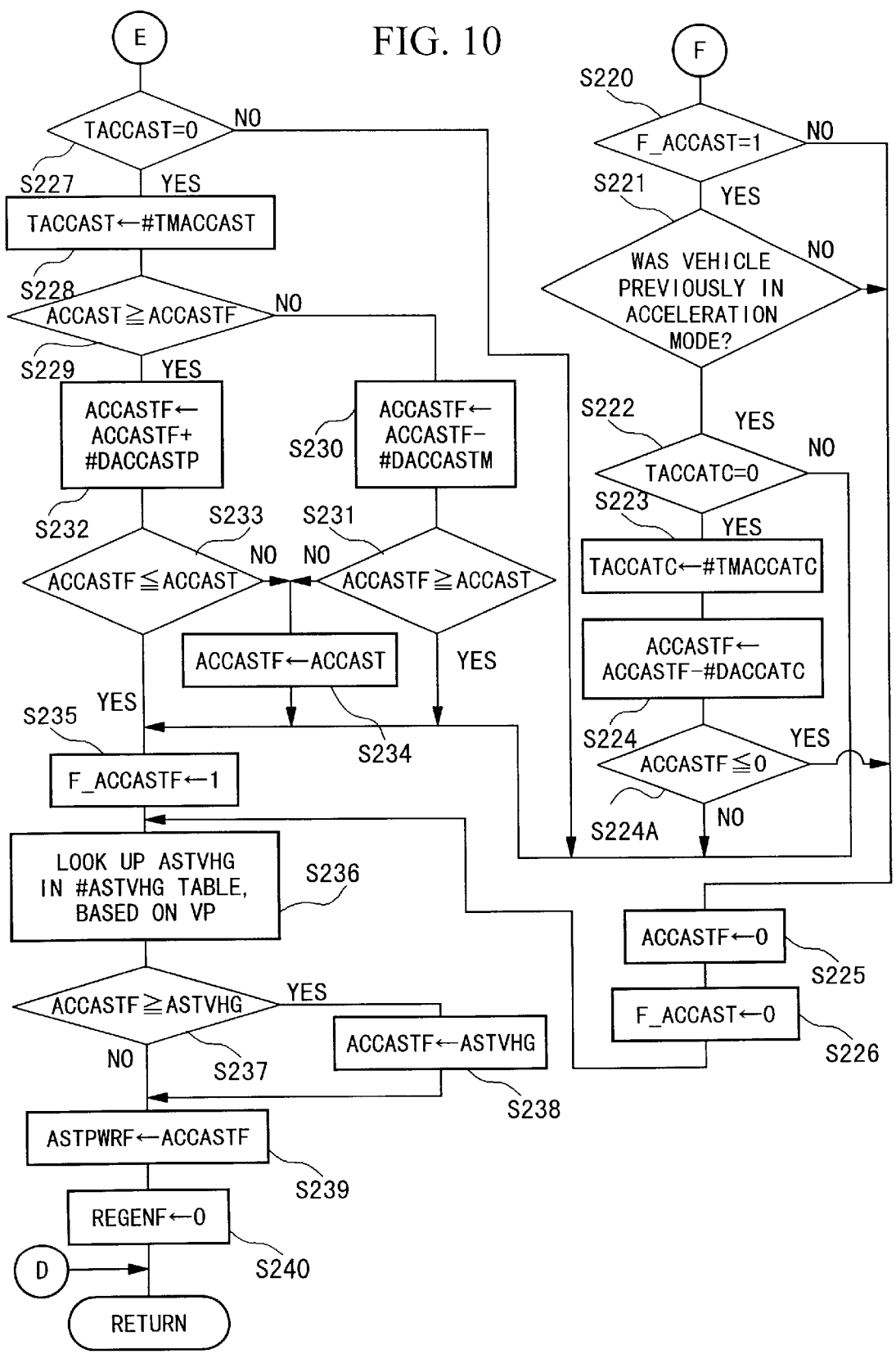
FIG. 10 is a flowchart showing acceleration mode of the first embodiment of the present invention.

Accordingly, the determination results in acceleration mode in FIGS. 9 and 10 are NO. Subsequently, in step S229, the assistance amount is gradually decreased (steps S230, S231, and S235) because the acceleration assistance calculation value ACCAST<the acceleration assistance final calculation value ACCASTF, and the driver does not feel uneasy (in the latter half of the graph of FIG. 21).

Even the turning vehicle decreases the engine speed to an idle state and accelerates after turning, the acceleration is improved, and the commercial value of the vehicle is increased. Even when in an MT vehicle the differences in the ratios between the first and second gears, and between the second and third gear ratios, the variation in the output is decrease at the time of the shift-up of the gear. Therefore, when the gear ratios are set high to improve the fuel consumption, sufficient acceleration and a smooth shift-up action of the gear can be ensured.

Second Embodiment

FIG. 1 shows the embodiment of the present invention applied to a parallel hybrid vehicle. Driving forces from both an engine E and an electric motor M are transmitted via a transmission T of an automatic transmission, or a manual transmission, to front wheels Wf, which are the drive wheels. When the hybrid vehicle decelerates and the driving force is transmitted from the front wheels Wf to the motor M, the motor M acts as a generator to generate what is termed a regenerative braking force, so that the kinetic energy of the vehicle body is stored as electric energy.

A power drive unit 2 performs the driving and regeneration of the motor M in response to control commands from a motor ECU 1. A high-voltage battery 3 for sending and receiving electric energy to and from the motor M is connected to the power drive unit 2. The battery 3 includes a number of modules connected in series, each module having a number of cells connected in series. The hybrid vehicle includes a 12-volt auxiliary battery 4 for driving various accessories. The auxiliary battery 4 is connected to the battery 3 via a downverter 5. The downverter 5, controlled by an FIECU 11, reduces the voltage from the battery 3 and charges the auxiliary battery 4.

The FIECU 11 controls, in addition to the motor ECU 1 and the downverter 5, a fuel supply amount controller 6 for controlling the amount of fuel supplied to the engine E, a starter motor 7, an ignition timing, etc. Therefore, the FIECU 11 receives a signal from a speed sensor $S_1$ for detecting the vehicle speed V based on the rotation of the driving shaft of the transmission, a signal from an engine rotational speed sensor $S_2$ for detecting the engine rotational speed NE, a signal from a shift position sensor $S_3$ for detecting the shift position of the transmission T, a signal from a brake switch $S_4$ for detecting operation of a brake pedal 8, a signal from a clutch switch $S_5$ for detecting operation of a clutch pedal 9, a signal from a throttle valve opening sensor $S_6$ for detecting the throttle opening state TH, and a signal from an air intake passage pressure sensor $S_7$ for detecting the air intake passage pressure PB. In FIG. 1, reference numeral 21 denotes a CVTECU for controlling a CVT (Continuously Variable Transmission), and reference numeral 31 denotes a battery ECU for protecting the battery 3 and calculating the state of charge (remaining charge) SOC of the battery 3.

The control modes of the hybrid vehicle are "idle stop mode" in which the engine stops when the vehicle stops while meeting predetermined conditions, "idle mode" in which the fuel supply is restarted after the fuel supply cut and the engine is maintained in the idle state, "deceleration mode" in which the regenerative braking is performed by the motor, "acceleration mode" in which the motor assists the engine, and "cruise mode" in which the motor is not driven and the vehicle is driven only by the engine.

[Zoning of State of Charge (SOC)]

The zoning of the state of charge (also referred to as the "remaining charge" or SOC) (dividing the remaining charge into zones) will be explained. The calculation of the SOC is carried out by the battery ECU 31, based on, i.e., the voltage, the discharged current, or the temperature.

In this example, zone A (from 40% to 80 or 90% of SOC), which is the normal use zone, is defined as the standard. Zone B (from 20% to 40% of the SOC), which is a temporary use zone, is below zone A, and zone C (from 0% to 20% of the SOC), which is an over-discharge zone, is below zone B. Zone D (from 80% or 90% to 100% of the SOC), which is an overcharge zone, is above zone A.

The SOC is calculated by integrating the discharged current when in zones A and B, and is calculated based on voltages when in zones C and D, taking into consideration the characteristics of the battery.

The boundaries between zones have upper and lower threshold values. The threshold values when the SOC is increasing are chosen to differ from those when the SOC is decreasing so as to cause hysteresis.

Figure 22:
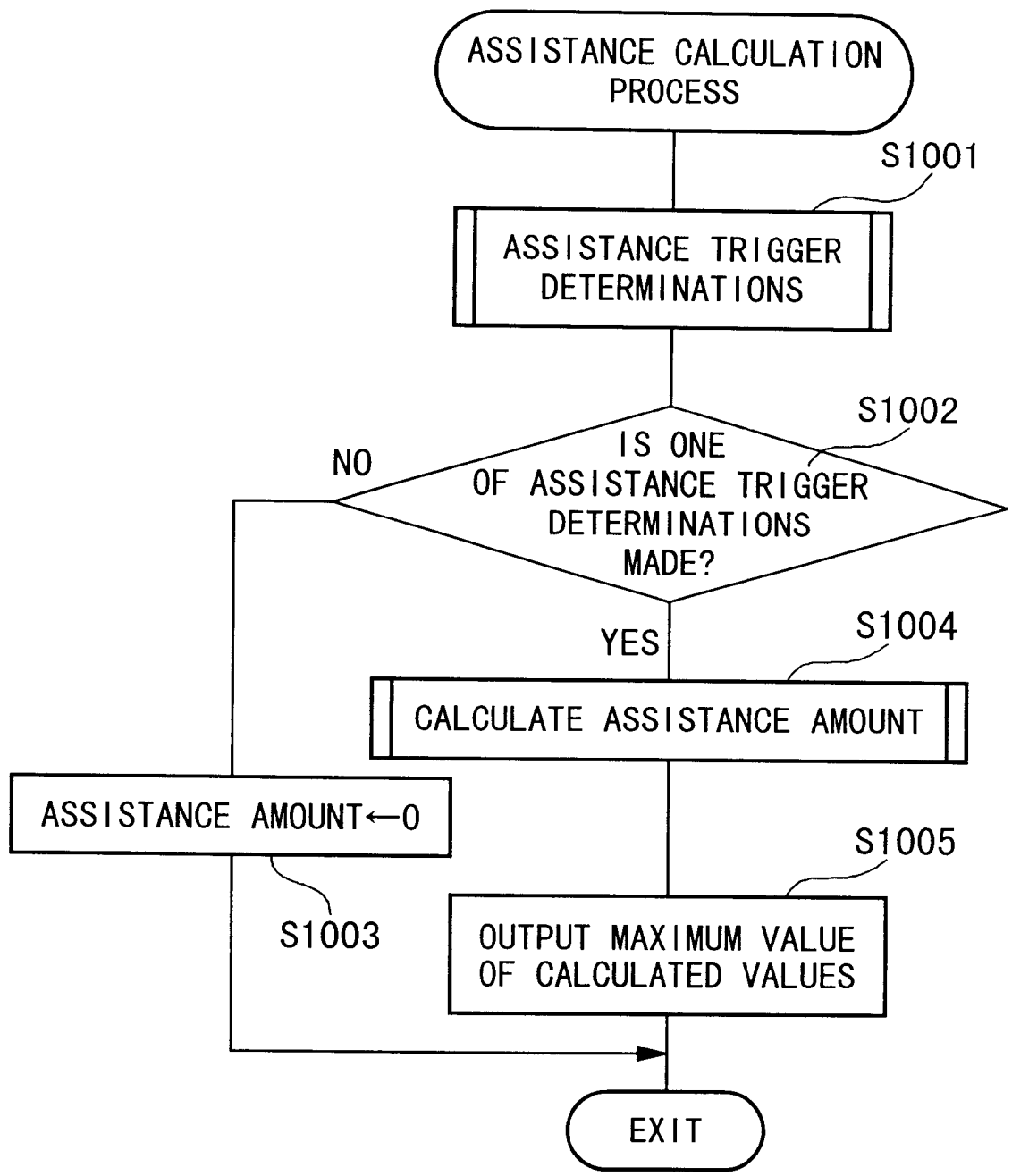
FIG. 22 is a flowchart showing the outline of the assistance calculation process of the second embodiment of the present invention.

FIG. 22 shows the outline of an assistance control (it will be explained in detail later), and more specifically, an assistance calculation process.

In step S1001 in FIG. 22, an assistance trigger determination (shown in FIG. 23) is conducted, and it is determined in step S1003 whether one of the assistance triggers is determined or not. When in step S1002 no assistance trigger has been determined, the assistance amount is set to 0 in step S1003, and the control terminates. When in step S1002 the assistance trigger is determined, the flow proceeds to step S1004, the assistance amount is then calculated, and the maximum value of the calculated values in step S1004 is output in step S1005.

A starting assistance trigger determination is performed to calculate an assistance trigger value and the assistance amount separately from the normal assistance amount, when in the case of the manual transmission vehicle the air intake passage pressure is equal to or above a predetermined value, or when in the case of the CVT vehicle the degree of throttle opening is equal to or above a predetermined value. A boost assistance trigger determination is performed in order to compensate for the shortage of torque during the shift-up action of the low gear by calculating the assistance trigger value and the assistance amount separately from the normal assistance trigger determination. Hereinafter, acceleration mode, the normal assistance trigger determination, the starting assistance trigger determination, the boost assistance trigger determination, and the related process will be explained.

[Acceleration Mode]

Figure 23:
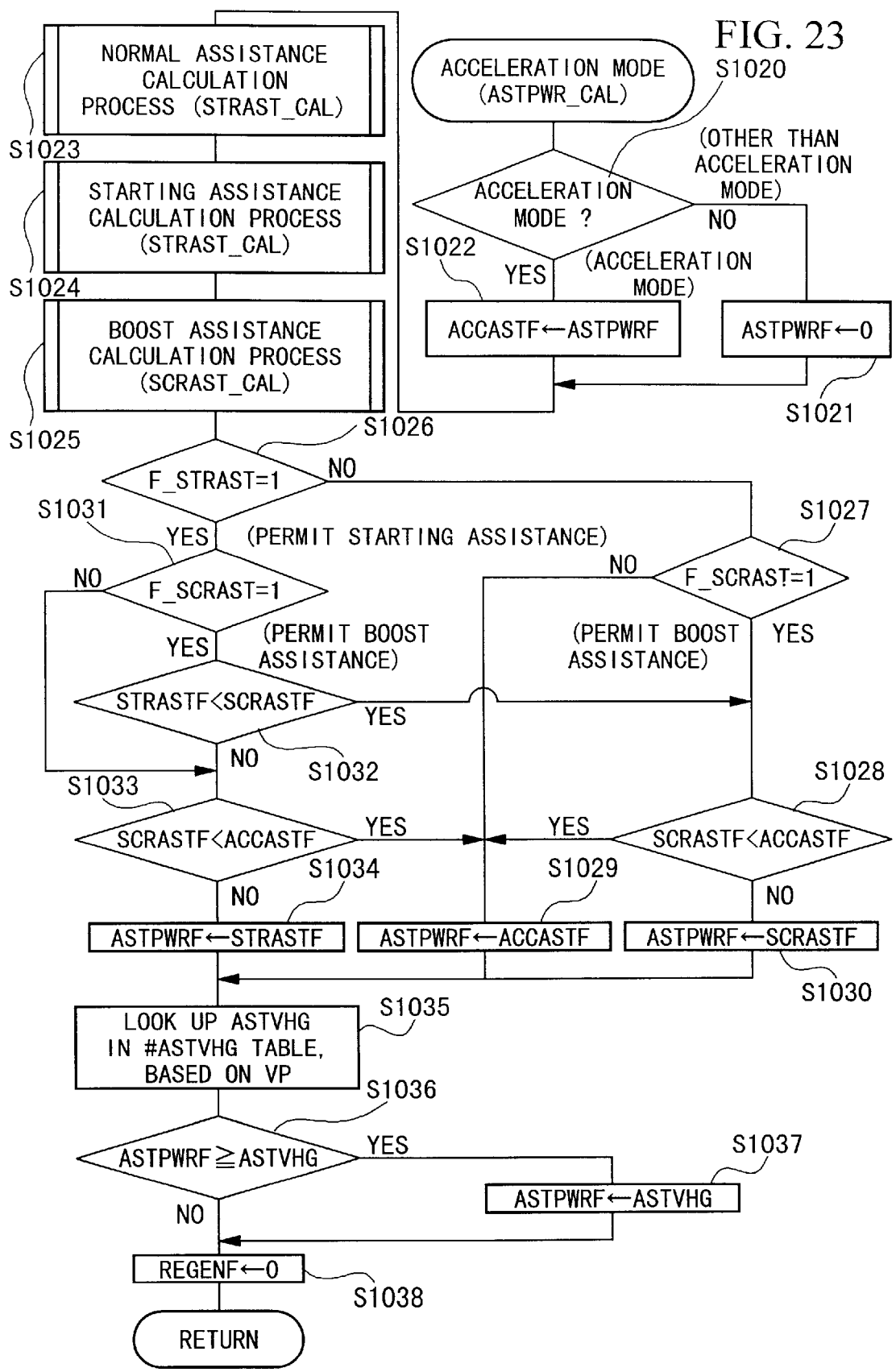
FIG. 23 is a flowchart showing acceleration mode of the second embodiment of the present invention.

FIG. 23 shows a flowchart showing acceleration mode. Specifically, in acceleration mode, one of the normal assistance trigger determination, the starting assistance trigger determination, and the boost assistance trigger determination is selected, and the assistance amount is set depending on the selected assistance trigger determination.

Initially, in step S1020, it is determined whether acceleration mode is selected. When acceleration mode is not selected, a final assistance command value ASTPYWRF is set to 0 in step S1021, and the flow proceeds to step S1023. When in step S1020 acceleration mode is selected, a normal assistance final calculation value ACCASTF is set to the final assistance command value ASTPWRF in step S1022, and the flow proceed to step S1023.

The normal assistance amount is calculated in step S1023, the starting assistance amount is calculated in step S1024, and the boost assistance amount is calculated in step S1025. These assistance amounts are calculated according to a flowchart described below. In step S1026, it is determined whether the starting assistance permission flag F_STRAST is 1 or not. When the determination is YES, the flow proceeds to step S1031, and it is determined whether the boost assistance permission flag F_SCRAST is 1 or not. When in step S1031 the determination is YES, the flow proceeds to step S1032, and it is then determined whether the final boost assistance calculation value SCRASTF is above the final starting assistance calculation value STRASTF or not. When in step S1032 the determination is YES, the flow proceeds to step S1028. When in step S1032 the determination is NO, the flow proceeds to step S1033 in a manner similar to the case when in step S1031 the determination is NO.

When in step S1026 the determination is NO, the flow proceeds to step S1027, and it is then determined whether the boost assistance permission flag F_SCRAST is 1 or not. When this determination is YES, the flow proceeds to step S1028. When in step S1027 the determination is NO, the flow proceeds to step S1029.

In step S1033, it is determined whether the final normal assistance calculation value ACCASTF is above the final starting assistance calculation value STRASTF or not. When this determination is YES, the flow proceeds to step S1029. When the determination is NO, the flow proceeds to step S1034.

In step S1028, it is determined whether the final normal assistance calculation value ACCASTF is above the final boost assistance calculation value SCRASTF or not. When the determination is YES, the flow proceeds to step S1029. When the determination is NO, the flow proceeds to step S1030.

In step S1034, the final assistance command value AST-PWRF is set to the final starting assistance calculation value STRASTF. In step S1029, the final assistance command value ASTPWRF is set to the final normal assistance calculation value ACCASTF. In step S1030, the final assistance command value ASTPWTRF is set to the boost assistance calculation value SCRASTF.

Thus, according to the determination, the highest value among the final starting assistance calculation value STRASTF, the final normal assistance calculation value ACCASTF, and the final boost assistance calculation value SCRASTF is selected.

When in one of steps S1029, S1030, and S1034 the final assistance command value ASTPWRF is set to a predetermined assistance amount, an assistance amount upper limit value ASTVHG is looked up in a table, depending on the vehicle speed VP in step S1035 as shown in FIG. 14. In step S1036, it is determined whether the final assistance command value ASTPWRF is equal to or above the assistance upper limit value ASTVHG or not. When this determination is YES, the final assistance command value is set to the assistance upper limit value ASTVHG in step S1037, a final generation is set to 0 in step S1038, and the flow returns.

When in step S1036 the determination is NO, the flow proceeds to step S1038. Thus, in acceleration mode, the final assistance command value ASTPWRF is set to the highest assistance value of the assistance amounts corresponding to the requested assistance determination, and the generation is set to 0.

[Normal Assistance Trigger Determination]

Figure 24:
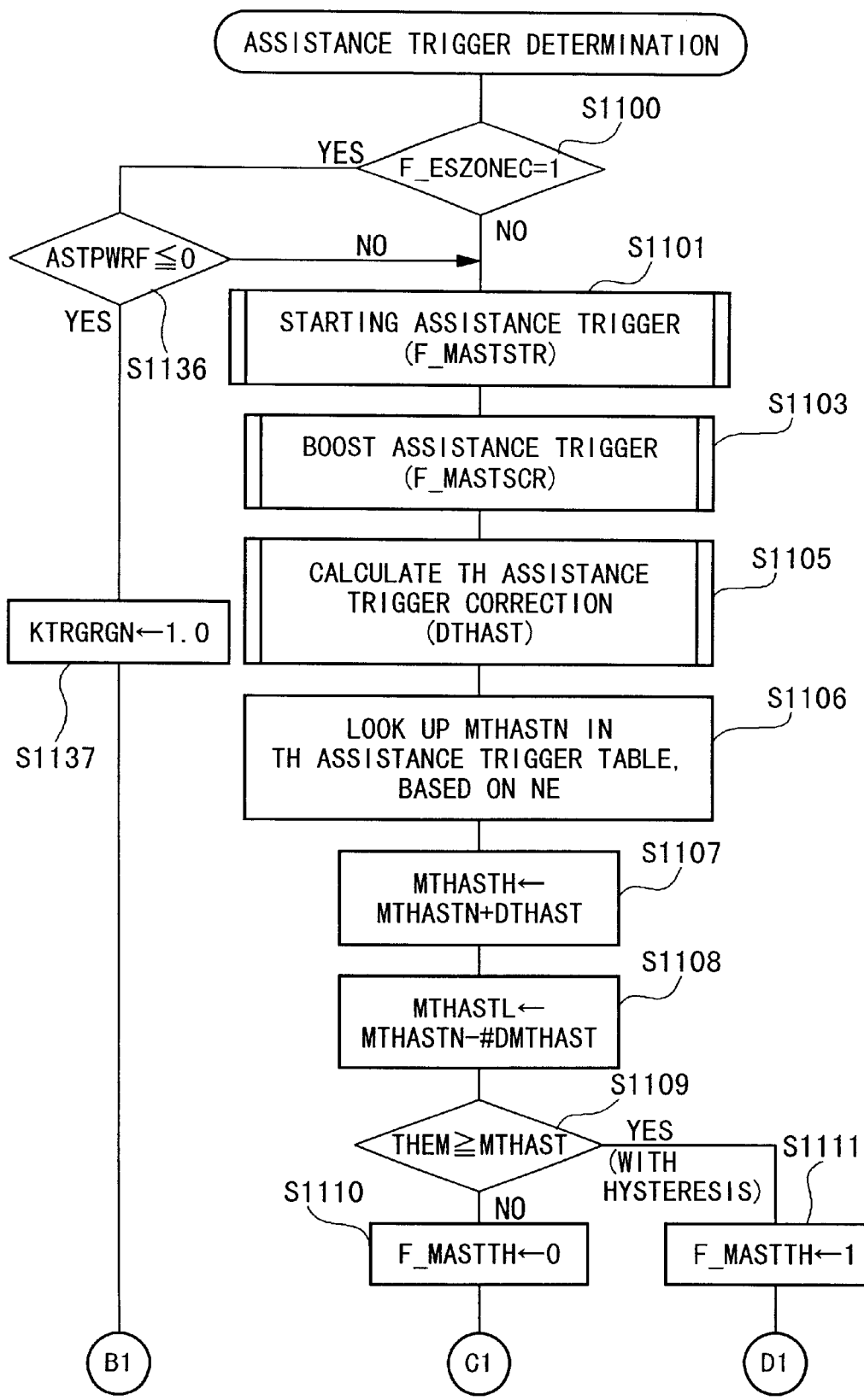
FIG. 24 is a flowchart showing the normal assistance trigger determination of the second embodiment of the present invention.
Figure 25:
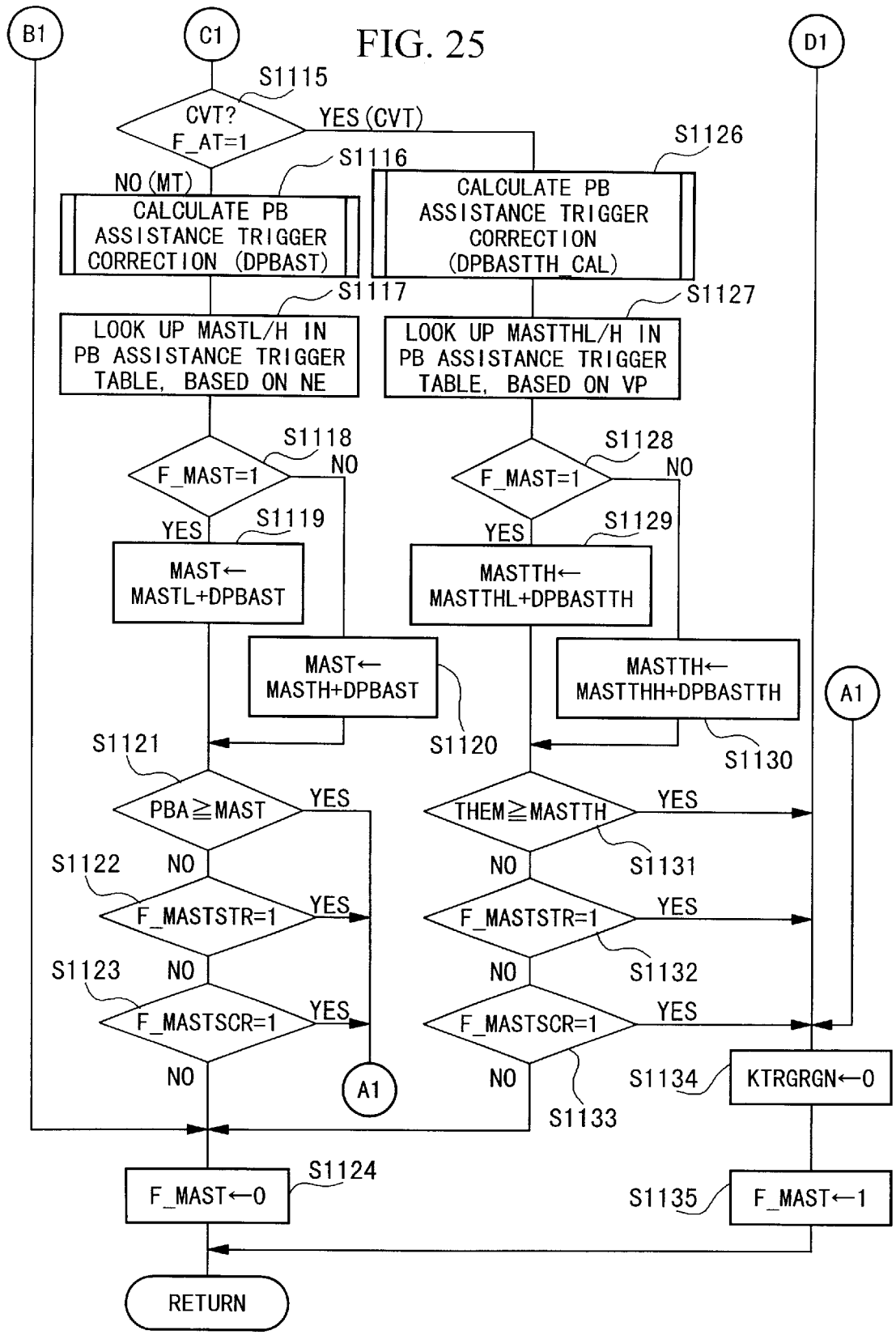
FIG. 25 is a flowchart showing the normal assistance trigger determination of the second embodiment of the present invention.

FIGS. 24 and 25 show flowcharts of the normal assistance trigger determination, specifically, flowcharts for determining assist/cruise mode depending on zone of the SOC and determining whether to perform the assistance when the vehicle accelerates.

In step S110, it is determined whether an energy storage zone C flag F_ESZONEC is 1 or not. When the determination is YES, that is, when the remaining battery charge SOC is within zone C, it is determined in step S1136 whether or not the final assistance command value ASTPWRF is equal to or below 0. When in step S1136 the determination is YES, that is, when the final assistance command value ASTPWRF is equal to or below 0, a cruise generation subtractive coefficient KTRGRGN is set to 1 in step S1137, the motor assistance determination flag F_MAST is set to 1 in step S1124, and the flow returns.

When in steps S1100 and S1136 the determination is NO, the starting assistance trigger determination is made in step S1101. Although the detail will be described below, the starting assistance trigger determination process improves the starting performance by calculating the starting assistance trigger value and the assistance amount separately from the normal assistance amount, when the air intake passage pressure PB is equal to or above a predetermined value. When the starting assistance is required, the starting assistance request flag F_MASTSTR is set to 1.

In the next step S1103, the boost assistance trigger determination is made.

Although the detail will be described below, the boost assistance trigger determination process improves the acceleration performance by temporarily increasing the assistance amount. Basically, when the variation in the throttle operation, the boost assistance request flag F_MAST is set to 1.

In step S1105, a throttle assistance trigger correction value DTHAST is calculated. The contents of this process will be explained.

In the next step S1106, a threshold value MTHASTN, which is the standard for the throttle assistance trigger, is looked up in a throttle assistance trigger table. The throttle assistance trigger table, as shown in FIG. 5, with the solid lines, defines the threshold value MTHASTN for the throttle which is the standard for determining whether to perform the assistance by the motor, and depends on the engine speed NE.

In the next steps S1107 and S1108, the correction value DTHAST which was calculated in step S1105 is added to the standard threshold value MTHASTN for the throttle assistance trigger, to obtain thereby an upper throttle assistance trigger threshold value MTHASTH, and a difference #DMTHAST for setting hysteresis is subtracted from the upper throttle assistance trigger threshold value MTHASTH, to obtain thereby a lower throttle assistance trigger threshold value MTHASTL. In FIG. 5, the upper and lower throttle assistance trigger threshold values are shown with the dashed lines above and below the standard threshold value MTHASTN according to the throttle assistance trigger table.

In step S1109, it is determined whether the present value THEM of the degree of throttle opening is equal to or above the throttle assistance trigger threshold value MTHAST obtained in steps S1107 and S1108 or not. The throttle assistance trigger threshold value MTHAST has the hysteresis. Therefore, when the degree of throttle opening is increasing, the upper throttle assistance trigger threshold value MTHASTH is referenced, whereas, when the degree of throttle opening is decreasing, the lower throttle assistance trigger threshold value MTHASTL referenced.

When in step S1109 the determination is YES, that is, the present value THEM of the degree of throttle opening is equal to or above the throttle assistance trigger threshold value MTHAST (which provides upper and lower hysteresis), the flow proceeds to step S1111. When in step S1109 the determination is NO, that is, when the present value THEM of the degree of throttle opening is below the assistance trigger threshold value MTHAST (which provides upper and lower hysteresis), the flow proceeds to step S1110.

In step S1111, a throttle motor assistance determination flag F_MASTTH is set to 1, the cruise generation subtractive coefficient KTRGRGN is set to 0 in step S1134, the motor assistance determination flag F_MAST is set to 1 in step S1135, and the flow returns. On the other hand, in step S1110, the throttle motor assistance determination flag F_MASTTH is set to 0.

In the above process, the determination as to whether the degree of throttle opening TH meets the requirement of the motor assistance was made. When the present value THEM of the degree of throttle opening is equal to or above the throttle assistance trigger threshold value MTHAST in step S1109, the throttle motor assistance determination flag F_MASTTH is set to 1.

On the other hand, when the throttle motor assistance determination flag F_MASTH is set to 0 in step S1110, the motor assistance determination is not performed based on the degree of throttle opening. This embodiment performs the assistance trigger determination, based on both the degree of throttle opening TH and the air intake passage pressure PB. When the present value THEM of the degree of throttle opening is equal to or above the throttle assistance trigger threshold value MTHAST, the assistance determination is made based on the degree of throttle opening TH. When THEM is below MTHAST, the assistance determination is made based on the air intake passage pressure PB.

In step S1115, it is determined whether an MT/CVT determination flag F_AT is 1 or not. When this determination is NO, that is, when the vehicle has an MT vehicle, the flow proceeds to step S1116. When in step S1115 the determination is YES, that is, when the vehicle is a CVT vehicle, the flow proceeds to step S1126. In step S1116, an air intake passage pressure (PB) assistance trigger correction value DPBAST is calculated. The contents of the process will be described later.

Figure 6:
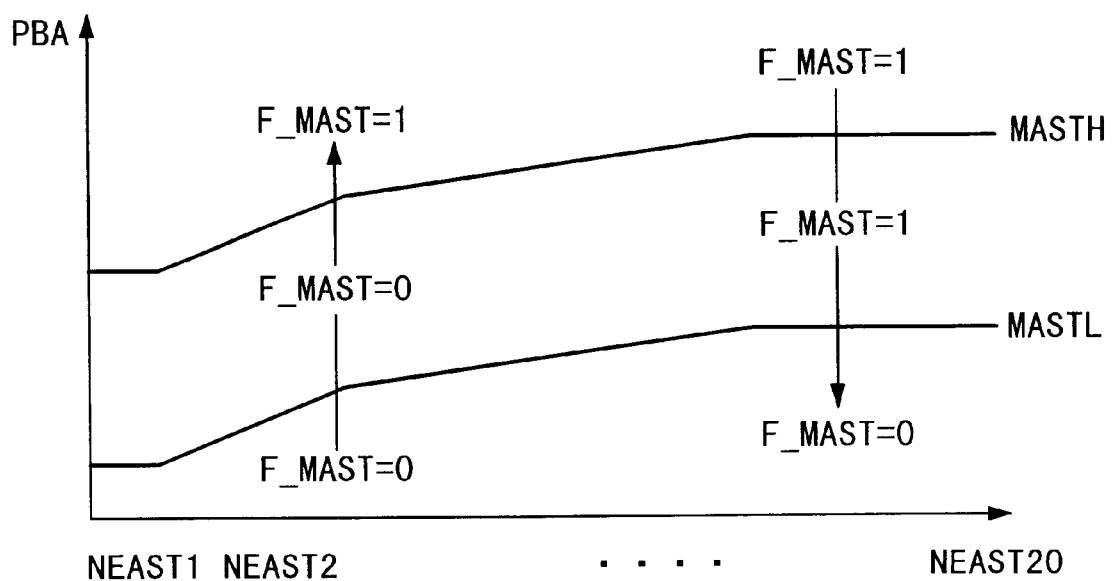
FIG. 6 is a graph showing the threshold values in PB assistance mode in an MT vehicle of the first embodiment of the present invention.

In the next step S1117, an air intake passage pressure (PB) assistance trigger threshold value MASTL/H is looked up in a PB assistance trigger table. This PB assistance trigger table, as shown in FIG. 6 with two solid lines, defines an upper PB assistance trigger threshold value MASTH and a lower PB assistance trigger threshold value MASTL for determining whether to perform the assistance by the motor, depending on the engine speed NE. In the look-up process in step S1117, when the air intake passage pressure PBA, as it is increased or as the engine rotational speed NE is decreased, crosses the upper threshold value line MASTH from the lower area to the upper area in FIG. 6, the motor assistance determination flag F_MAST is switched from 0 to 1. When PBA, as it is decreased or as NE is increased, crosses the lower threshold value line MASTL from the upper area to the lower area, the motor assistance determination flag F_MAST is switched from 1 to 0. The process shown in FIG. 6 is changed depending on the position of the gear, and depending on the stoichiometric or the lean-burn state.

In the next step S1118, it is determined whether the motor assistance determination flag F_MAST is 1 or not. When this determination is 1, the flow proceeds to step S1119. When the determination is not 1, the flow proceeds to step S1120. In step S1119, the lower PB assistance trigger threshold value MASTL which was looked up in step S1117, is added to the correction value DPBAST calculated in step S1116, to obtain thereby an air intake passage assistance trigger value MAST. In step S1121, it is determined whether the present value PBA of the air intake passage pressure is equal to or above MAST obtained in step S1119. When this determination is YES, the flow proceeds to step S1134. When the determination is NO, the flow proceeds to step S1122. In step S1120, the upper PB assistance trigger threshold value MASTH looked up in step S1117 is added to the correction value DPBAST calculated in step S1116, to obtain thereby the air intake passage assistance trigger threshold value MAST, and the flow proceeds to step S1121.

In step S1122, it is determined whether the starting assistance request flag F_MASTSTR is 1 or not. When this determination is YES, the flow proceeds to step S1134. When in step S1122 the determination is NO, it is determined in step S1123 whether the boost assistance request flag F_MASTSCR is 1 or not. When this determination is YES, the flow proceeds to step S1134. When in step S1123 the determination is NO, the motor assistance determination flag F_MAST is set to in step S1124, and the flow returns.

When in step S1115 the determination as to the MT/CVT determination flag F_AT is YES, that is, when the vehicle is a CVT vehicle, the air intake passage pressure assistance trigger correction value DPBASTTH is calculated in step S1126. The contents of this process will be explained later.

Figure 26:
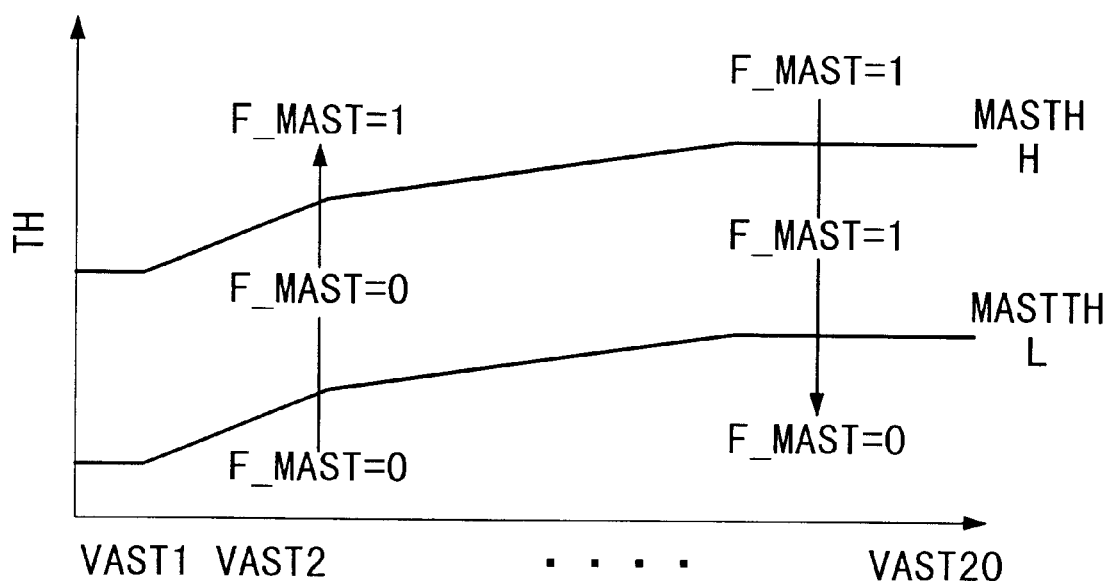
FIG. 26 is a graph showing threshold values in PB assistance mode in an MT vehicle of the second embodiment of the present invention.

In step S1127, the PB assistance trigger threshold values MASTTHL/H are looked up in the PB assistance trigger table. The PB assistance trigger table, as shown in FIG. 26 with two solid lines, defines an upper PB assistance trigger threshold value MASTTHH and a lower PB assistance trigger threshold value MASTTHL for determining whether to perform the assistance by the motor, depending on the vehicle speed VP. In the look-up process in step S1127, when the degree of throttle opening TH, as it is increased or as the vehicle speed VP is decreased, crosses the upper threshold value line MASTTHH from the lower area to the upper area in FIG. 26, the motor assistance determination flag F_MAST is switched from 0 to 1. When TH, as it is decreased or as VP is increased, crosses the lower threshold value line MASTTHL from the upper area to the lower area, the motor assistance determination flag F_MAST is switched from 1 to 0. The process shown in FIG. 26 is changed depending on the position of the gear, and depending on the stoichiometric or the lean-burn state.

In step S1128, it is determined whether the motor assistance determination F_MAST is 1 or not. When the flag is 1, the flow proceeds to step S1129. When it is not 1, the flow proceeds to step S1130. In step S1129, the lower PB assistance trigger threshold value MASTTHL looked up in step S1127 is added to the correction value DPBASTTH calculated in step S1126, to obtain thereby the PB assistance trigger threshold value MASTTH. In step S1131, it is determined whether the present value THEM of the degree of throttle opening is equal to or above the PB assistance trigger threshold value MASTTH calculated in step S1129 or not. When the determination is YES, the flow proceeds to step S1134. When the determination is NO, the flow proceeds to step S1132.

In step S1130, the upper PB assistance trigger threshold value MASTTHH that was looked up in step S1127 is added to the correction value calculated in step S1126, to obtain thereby the PB assistance trigger threshold value MASTTH, and the flow proceeds to step S1131.

In step S1132, it is determined whether the starting assistance request flag F_MASTSTR is 1 or not. When the determination is YES, the flow proceeds to step S1134. When in step S1132 the determination is NO, it is determined in step S1133 whether the boost assistance request flag F_MASTSCR is 1 or not. When the determination is YES, the flow proceeds to step S1134. When in step S1133 the determination is NO, the flow proceeds to step S1124.

[TH Assistance Trigger Correction]

Figure 27:
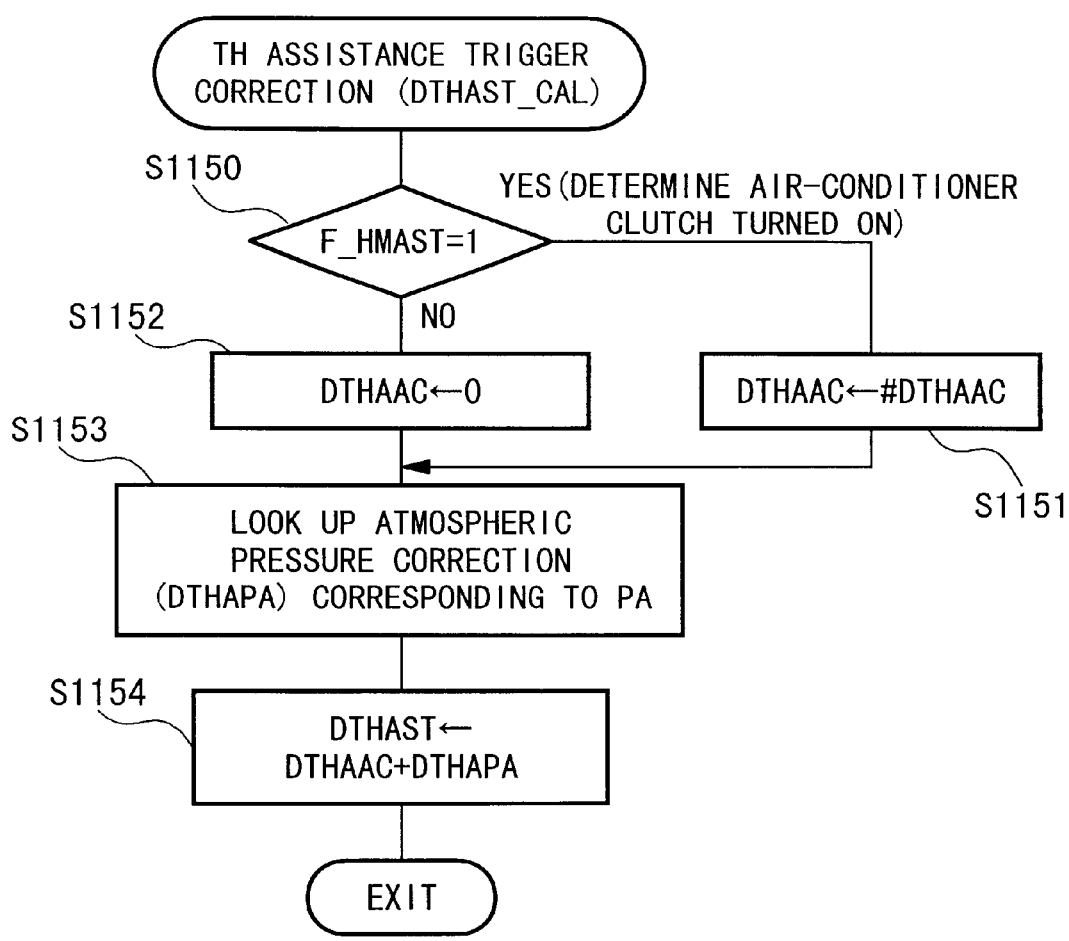
FIG. 27 is a flowchart showing the TH assistance trigger correction of the second embodiment of the present invention.

FIG. 27 is a flowchart showing the throttle assistance trigger correction in step S1105.

In step S1150, it is determined whether the air-conditioner clutch ON flag F_HMAST is 1 or not. When this determination is YES, that is, when the air conditioner clutch has been turned on, an air-conditioner correction value DTHAAC is set to a predetermined value #DTHAAC (e.g., 5 degrees) in step S1151, and the flow proceeds to step S1153.

When in step S1150 the determination is NO, that is, when the air-conditioner clutch has been turned off, the air-conditioner correction value DTHAAC is set to 0, and the flow proceeds to step S1153. Thus, the threshold value for the motor assistance is increased by the operation of the air conditioner.

Figure 28:
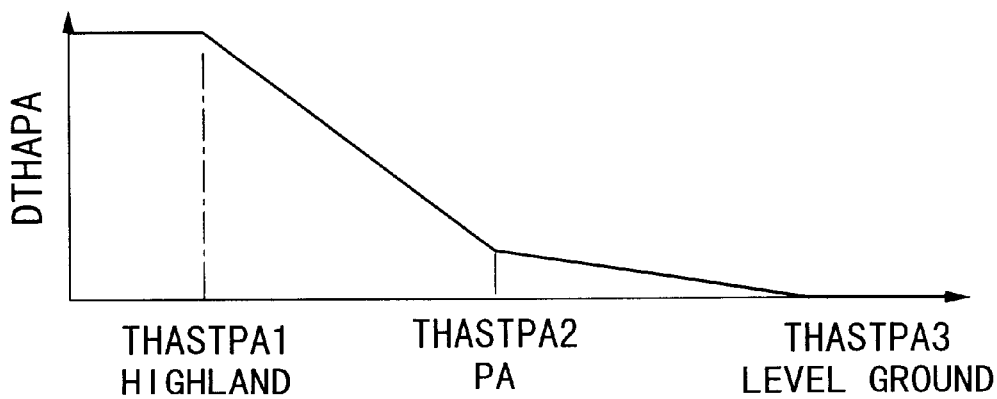
FIG. 28 is a graph showing an atmospheric pressure correction table of the second embodiment of the present invention.

In step S1153, an atmospheric pressure correction value (DTHAPA) is looked up, depending on the atmospheric pressure. As shown in FIG. 28, the correction value is looked up in a throttle assistance trigger PA correction table, and is decreased as the vehicle descends from a highland to a lowland. From this look-up process, the atmospheric pressure correction value DTHAPA is calculated.

In step S1154, the air-conditioner correction value DTHAAC obtained in step S1151 or S1152 is added to the atmospheric pressure correction value DTHAPA obtained in step S1153, to obtain the throttle assistance trigger correction value DTHAST, and the control terminates.

[PB Assistance Trigger Correction (for MT)]

Figure 29:
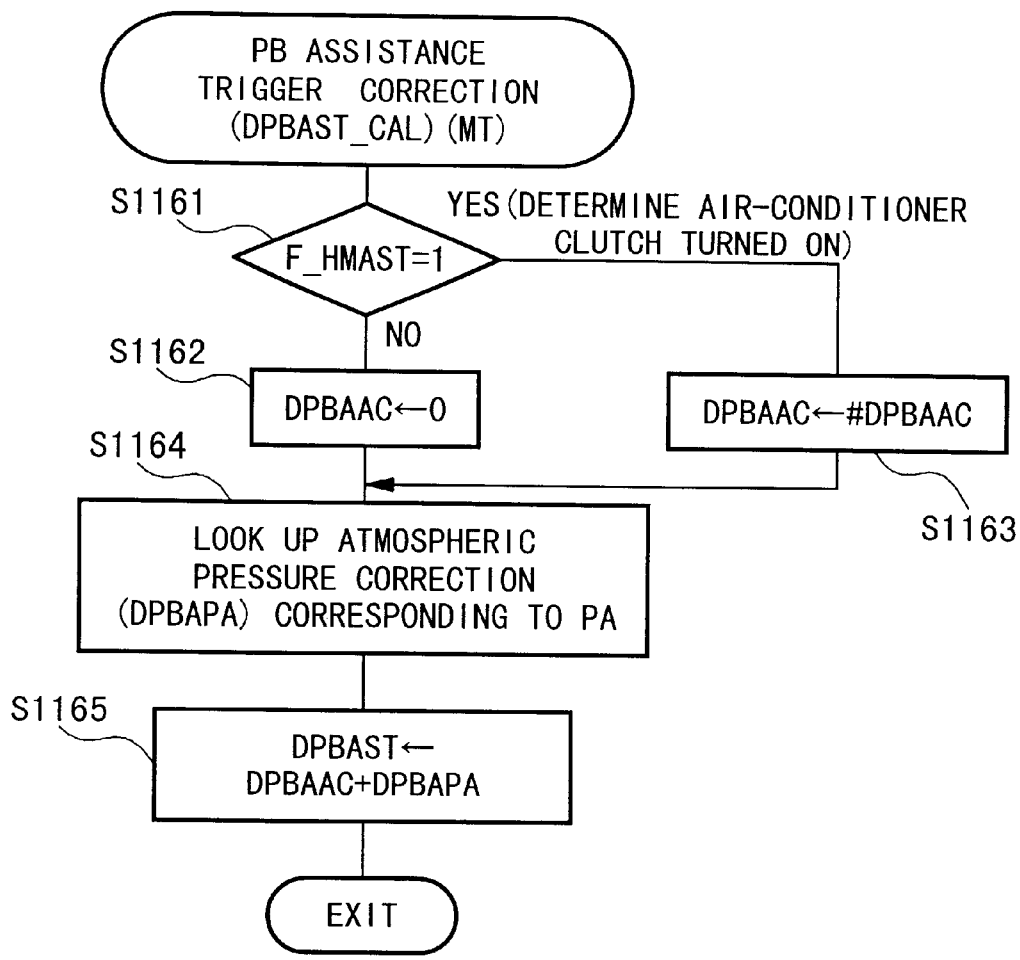
FIG. 29 is a flowchart showing the PB assistance trigger correction (for an MT vehicle) of the second embodiment of the present invention.
Figure 30:
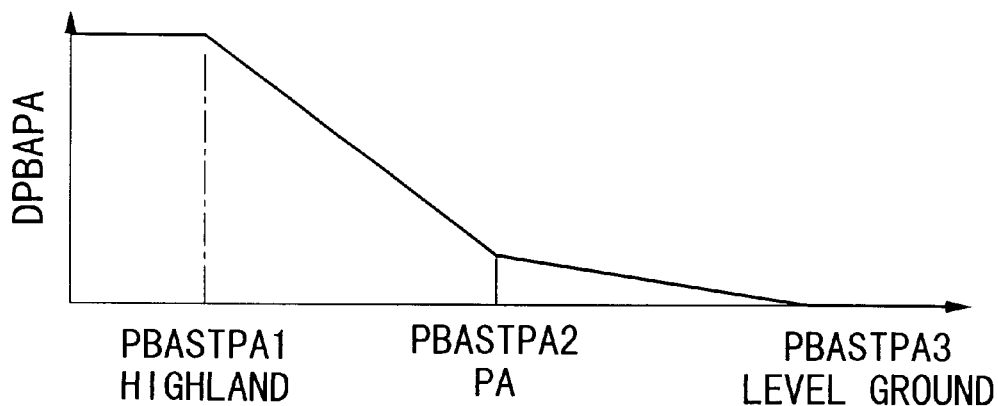
FIG. 30 is a graph showing an atmospheric pressure correction table of the second embodiment of the present invention.

FIG. 29 is a flowchart showing the PB throttle assistance trigger correction in step S1116.

In step S1161, it is determined whether the air-conditioner clutch ON flag F_HMAST is 1 or not. When the determination is YES, that is, when the air-conditioner clutch has been turned on, the air-conditioner correction value DPBAAC is set to a predetermined value #DPBAAC in step S1163, and the flow proceeds to step S1164. When in step S1161 the determination is NO, that is, when the air-conditioner clutch has been turned off, the air-conditioner correction value DPBAAC is set to 0 in step S1162, and the flow proceeds to step S1164. Thus, the threshold value for the motor assistance is increased.

In step S1164, an atmospheric pressure correction value (DPBAPA) is looked up, depending on the atmospheric pressure. As shown in FIG. 3, the correction value is looked up in a PB assistance trigger PA correction table, and is decreased as the vehicle descends from a highland to a lowland. In the look-up process, the atmospheric pressure correction value DPBAPA is obtained.

In the next step S1165, the air-conditioner correction value DPBAAC obtained in step S1162, or S1163 is added to the atmospheric pressure correction value DPBAPA obtained in step S1164, to obtain the PB assistance trigger correction value DPBAST, and the flow returns.

[PB Assistance Trigger Correction (CVT)]

Figure 31:
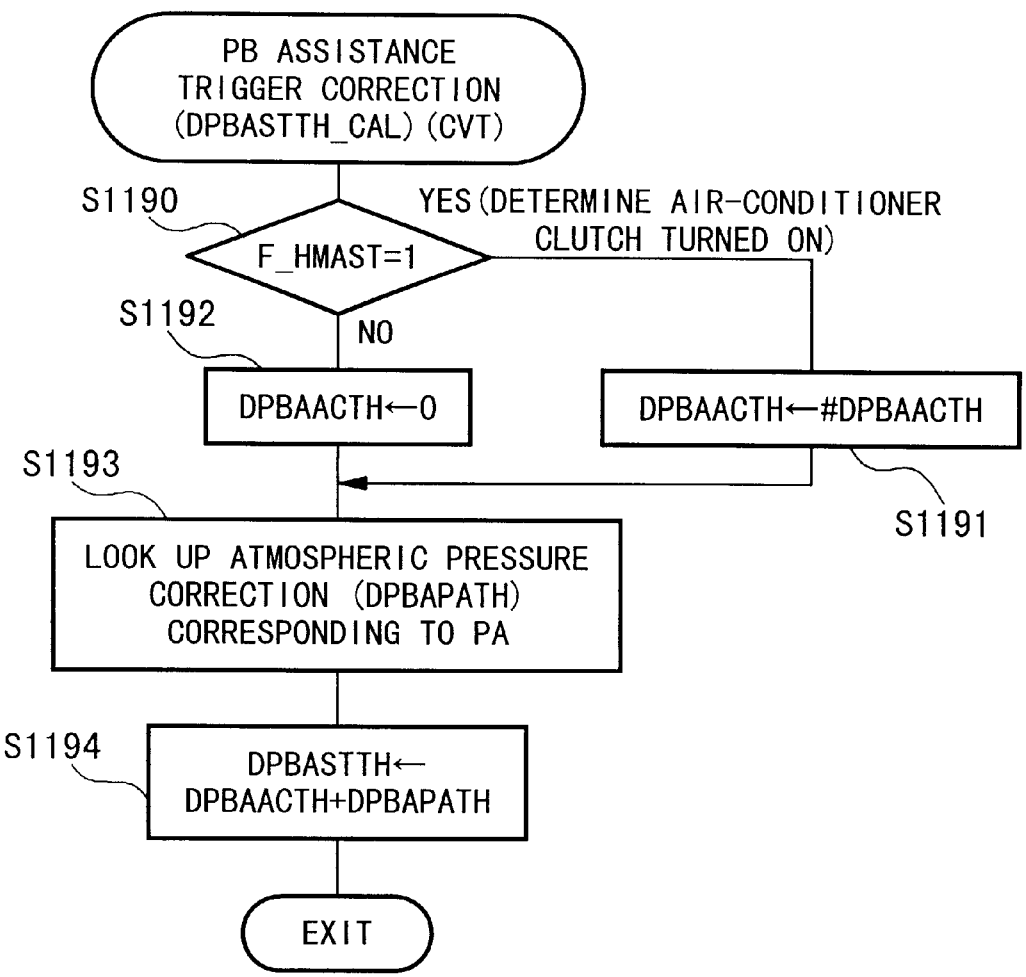
FIG. 31 is a flowchart showing the PB assistance trigger correction (for a CVT vehicle) of the second embodiment of the present invention.

FIG. 31 is a flowchart showing the PB assistance trigger correction in step S1126.

In step S1190, it is determined whether the air-conditioner clutch ON flag F_HMAST is 1 or not. When this determination is YES, that is, when the air-conditioner clutch has been turned on, the air-conditioner correction value DPBAACTH is set to a predetermined value #DPBAACTH in step S1191, and the flow proceeds to step S1193.

When in step S1190 the determination is NO, that is, when the air-conditioner clutch has been turned off, the air-conditioner correction value DPBAACTH is set to 0 in step S1192, and the flow proceeds to step S1193. Thus, the threshold value for the motor assistance is increased.

Figure 32:
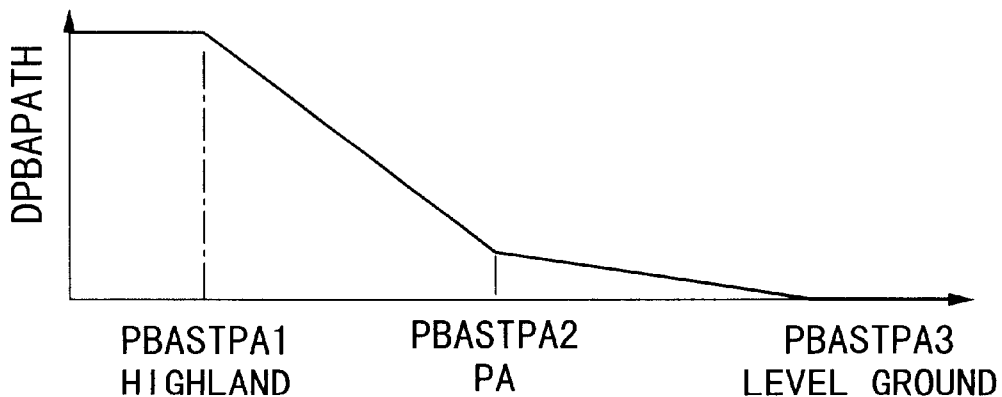
FIG. 32 is a graph showing an atmospheric pressure correction table of the second embodiment of the present invention.

In step S1193, the atmospheric pressure correction value (DPBAPATH) is looked up, depending on the atmospheric pressure. As shown in FIG. 32, the correction value is looked up in the PB assistance trigger PA correction table, and is decreased as the vehicle descends from a highland to a lowland. From this table look-up process, the atmospheric pressure correction value DPBAPATH is obtained.

In the next step S1194, the air-conditioner correction value DPBAACTH obtained in step S1191 or S192 is added to the atmospheric pressure correction value DPBAPATH obtained in step S1193, to obtain the throttle assistance trigger correction value DPBASTTH, and the control terminates.

[Normal Assistance Calculation Process]

Figure 33:
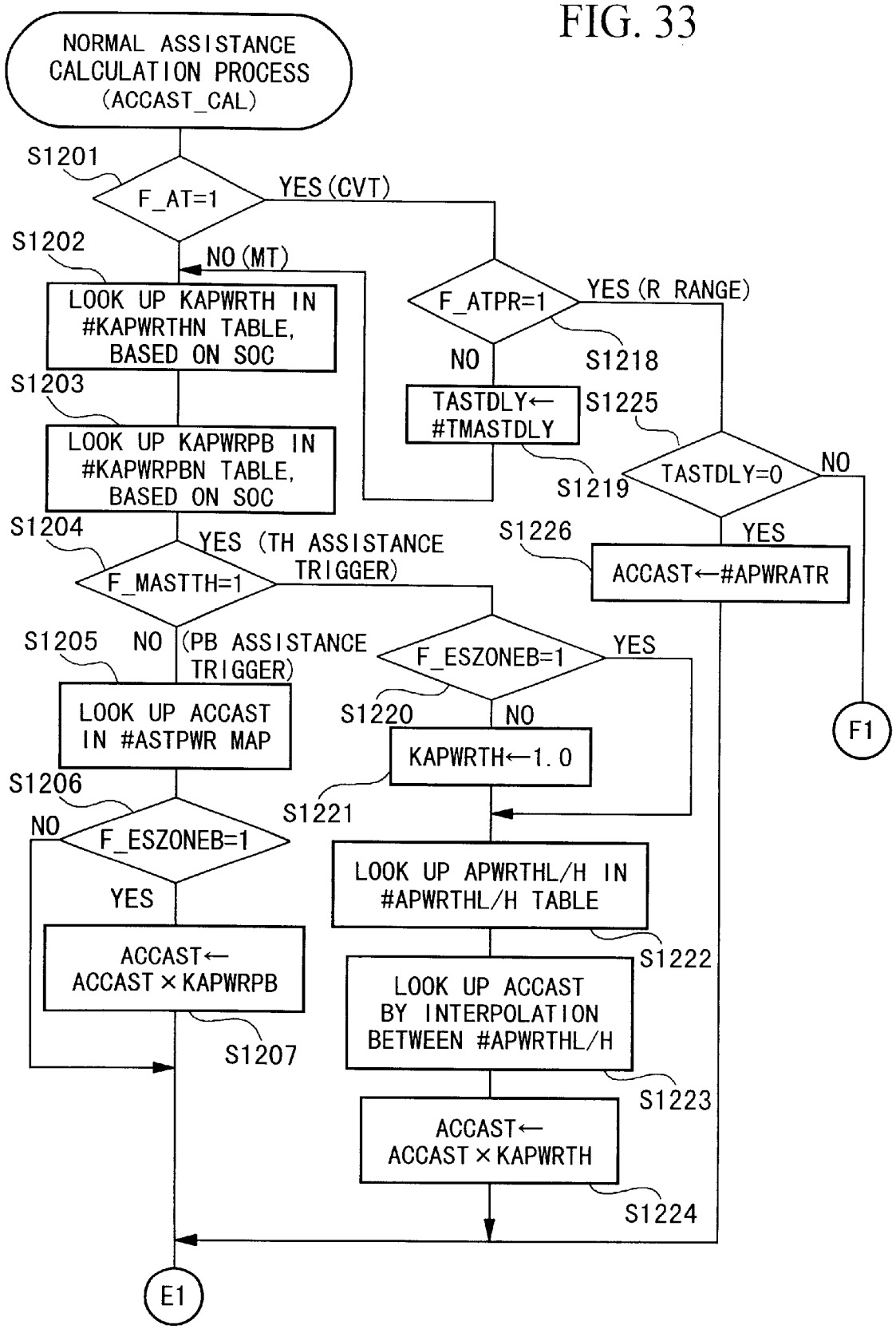
FIG. 33 is a flowchart showing the normal assistance calculation process of the second embodiment of the present invention.
Figure 34:
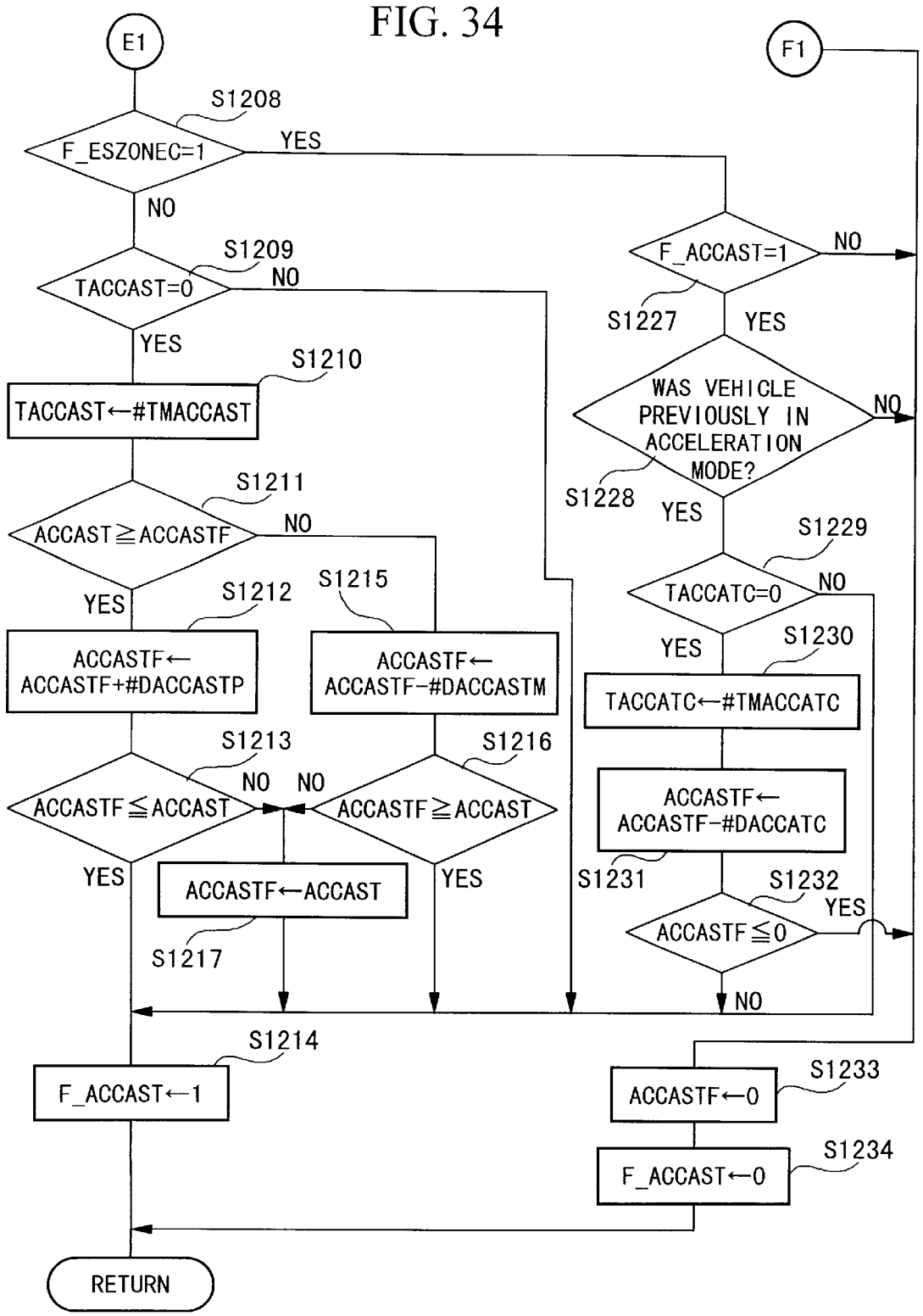
FIG. 34 is a flowchart showing the normal assistance calculation process of the second embodiment of the present invention.

FIGS. 33 and 34 are flowcharts showing the process for calculating the normal assist. In this process, the normal assistance amount is calculated.

In step S1201, it is determined whether the MT/CVT determination flag F_AT is 1 or not. When the vehicle is a CVT vehicle, the flow proceeds to step S1218. When in step S1201 the vehicle is an MT vehicle, the flow proceeds to step S1202. As shown in FIG. 11, a throttle assistance amount coefficient KAPWRTH is looked up in a table, depending on the remaining battery charge SOC, in step S1202. In the next step S1203, as shown in FIG. 12, the PB assistance amount coefficient KAPWRPB is looked up in a table, depending on the remaining battery charge SOC. Then, the flow proceeds to step S1204.

In step S1204, it is determined whether the throttle motor assistance determination flag F_MASTTH is 1 or not. When this determination is YES, that is, when in throttle assistance zone, the flow proceeds to step S1220, and it is then determined whether the energy storage zone B flag F_ESZONEB is 1 or not. When the determination is NO, that is, when the remaining battery charge SOC is outside zone B, the throttle assistance amount coefficient KAPWRTH is set to 1.0 in step S1221, and the flow proceeds to step S1222. When in step S1220 the determination is YES, the flow proceeds to step S1222.

In step S1222, as shown in FIG. 13, an upper throttle assistance amount threshold value APWRTHH and a lower throttle assistance amount threshold value APRWTHL are set, depending on the engine speed NE. Between these values, there is a regular difference, depending on the engine speed NE.

The flow proceeds to step S1223, and then a normal assistance calculation value ACCAST is obtained. As shown in FIG. 14, the normal assistance calculation value ACCAST is obtained by interpolating the assistance amount between the upper throttle assistance amount threshold value APWRTHH and the lower throttle assistance amount threshold value APWRTHL obtained in step S1222 from the throttle assistance trigger threshold value MTHAST to the degree of throttle opening #MTHASTH, which varies from MTHAST by a predetermined opening amount (for example, an opening degree based on a function of the engine rotational speed NE).

In step S1224, the normal assistance amount ACCAST is multiplied by the throttle assistance amount coefficient KAPWRTH, and the flow proceeds to step S1208.

When in step S1204 the determination is NO, that is, when in air intake passage pressure assistance zone, the flow proceeds to step S1205, and the assistance amount is then looked up in a map (not shown), depending on the engine speed NE and the air intake passage pressure PB, and the normal assistance calculation value ACCAST is set to the map value #ASTPWR. In step S1206, it is determined whether the energy storage zone B flag F_ESZONEB is 1 or not. When the determination is NO, that is, when the remaining battery charge SOC is outside zone B, the flow proceeds to step S1208. When in step S1206 the determination is YES, the normal assistance calculation value ACCAST is multiplied by the PB assistance amount coefficient KAPWRPB in step S1207, and the flow proceeds to step S1208. The map value #ASTPWR is changed according to the position of the gear in the MT vehicle.

When in step S1201 the vehicle is a CVT vehicle, it is determined in step S1218 whether a reverse position flag F_ATPR is 1 or not. When the determination is YES, that is, when the gear is in the R (reverse) range, the flow proceeds to step S1225, and it is then determined whether an assistance determination delay timer (for CVT range) TASTDLY is 0 or not. When the flag is not 0, the normal assistance final calculation value ACCASTF is set to 0 in step S1233, the assistance permission flag F_ACCAST is set to 0 in step S1234, and the flow returns. When in step S1225 the assistance determination delay timer TASTDLY is 0, the flow proceeds to step S1226, the normal assistance calculation value ACCAST is set to a predetermined value #APWRATR, and the flow proceeds to step S1208. When in step S1218 the determination is NO, the flow proceeds to step S1219, in which the assistance determination delay timer TASTDLY is then set to a predetermined value #TMASTDLY, and the flow proceeds to step S1202.

In step S1208, it is determined whether the energy storage zone C flag F_ESZONEC is 1 or not. When in step S1208 the determination is YES, that is, when the remaining battery charge SOC is within zone C, the flow proceeds to step S1227. In step S1227, it is determined whether the assistance permission flag F_ACCAST is 1 or not. When this determination is NO, that is, when the assistance permission flag F_ACCASTF is 0, the flow proceeds to step S1233.

When in step S1227 the determination is YES, that is, when the assistance permission flag F_ACCAST is 1, it is determined in step S1228 whether the vehicle was previously in the acceleration mode or not. When this determination is NO, that is, when the vehicle was not previously in the acceleration mode, the flow proceeds to step S1233. When in step S1228 the determination is YES, that is, when the vehicle was previously in the acceleration mode, the flow proceeds to step S1229, and it is then determined whether a DACCATC subtractive updating timer TACCATC is 0 or not. When the DACCATC subtractive updating timer TAC-CATC is not 0, the flow proceeds to step S1214. When in step S1229 TACCATC is 0, the flow proceeds to step S1230.

In step S1230, the DACCATC subtractive updating timer TACCATC is set to a timer value #TMACCATC. In step S1231, a gradual additional value #DACCATC is subtracted from the normal assistance final calculation value ACCASTF, and it is determined in step S1232 whether the normal assistance final calculation value ACCASTF is equal to or below 0. When the value is equal to or below 0, the flow proceeds to step S1233. When the value is above 0, the flow proceeds to step S1214.

When in step S1208 the determination is NO, the flow proceeds to step S1209, and it is then determined whether a gradual additional/subtractive updating timer TACCAST is 0 or not. When the gradual additional/subtractive updating timer TACCAST is not 0, the now proceeds to step S1214. When in step S1209 the gradual additional/subtractive updating timer TACCAST is 0, the flow proceeds to step S1201.

In step S1201, the gradual additional/subtractive updating timer TACCAST is set to a timer value #TMACCAST, and it is determined in step S1211 whether the normal assistance calculation value ACCAST is equal to or above the normal assistance final calculation value ACCASTF or not. When in step S1211 the determination is YES, that is, when ACCAST≧ACCASTF, the gradual additional value #DAC-CASTP is added to ACCASTF in step S1212, and it is determined in step S1213 whether ACCASTF is equal to or below ACCAST or not.

When in step S1213 the determination is YES, that is, when the normal assistance final calculation value ACCASTF≦the normal assistance calculation value ACCAST, the assistance permission flag F_ACCAST is set to 1 in step S1214, and the flow returns. When in step S1213 the determination is NO, that is, when ACCASTF>ACCAST, the normal assistance final calculation value ACCASTF is set to the normal assistance calculation value ACCAST in step S1217, and the flow proceeds to step S1214.

When in step S1211 the determination is NO, that is, when the normal assistance calculation value ACCAST<the normal assistance final calculation value ACCASTF, a gradual subtractive value #DACCASTM (e.g., 0.3 W) is subtracted from the normal assistance final calculation value ACCA-STF in step S1215, and it is determined in step S1216 whether ACCASTF is equal to or above ACCAST or not.

When in step S1216 the determination is YES, that is, when the normal assistance final calculation value ACCASTF≧the normal assistance calculation value ACCAST, the flow proceeds to step S1214. When in step S1216 the determination is NO, that is, when the ACCASTF<ACCAST, the flow proceeds to step S1217. Preferably, when the remaining battery charge SOC is within zone B. ACCASTF is gradually increased from the boundary between zones B and C to the boundary between zones A and C.

[Starting Assistance Trigger Determination]

Figure 35:
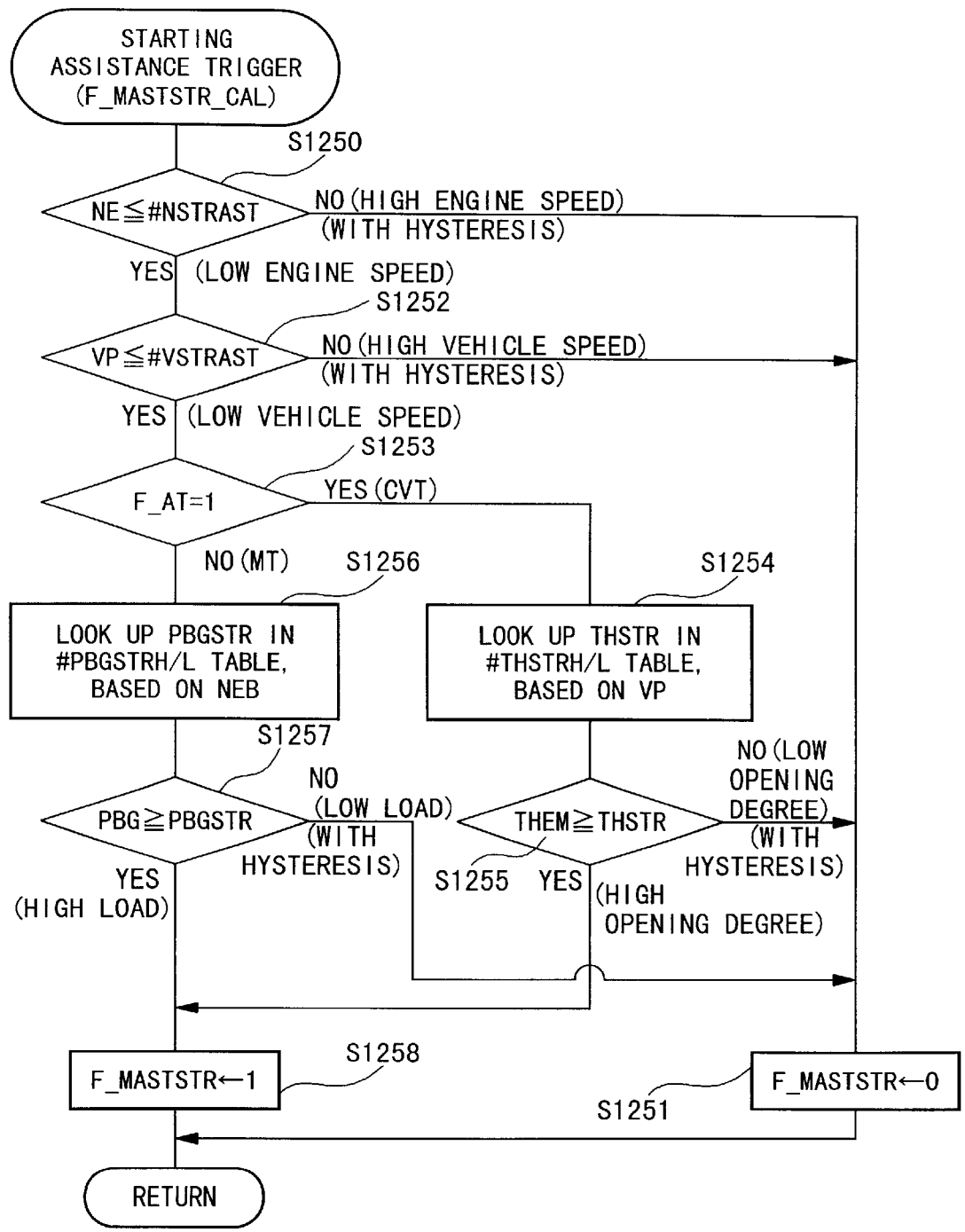
FIG. 35 is a flowchart showing the starting assistance trigger determination of the second embodiment of the present invention.

FIG. 35 is a flowchart showing the starting assistance trigger determination in step S1101.

In step S1250, it is determined whether the engine speed NE is equal to or below a starting assistance execution upper limit value #NSTRAST (with hysteresis, e.g., lower limit: 800 rpm, upper limit: 1000 rpm) or not. When the determination is NO, that is, when the engine speed is high, the starting assistance request flag F_MASTSTR is set to 0 in step S1251, and the flow returns. When in step S1250 the determination is YES, that is, when the engine speed is low, it is determined whether the vehicle speed VP is equal to or below a starting assistance execution upper limit vehicle speed #VSTRAST (with hysteresis, e.g., lower limit: 10 km/h, upper limit: 14 km/h) or not. When this determination is NO, that is, when traveling at a high speed, the flow proceeds to step S1251. When the determination is YES, that is, when traveling at a low speed, the flow proceeds to step S1253.

Figure 36:
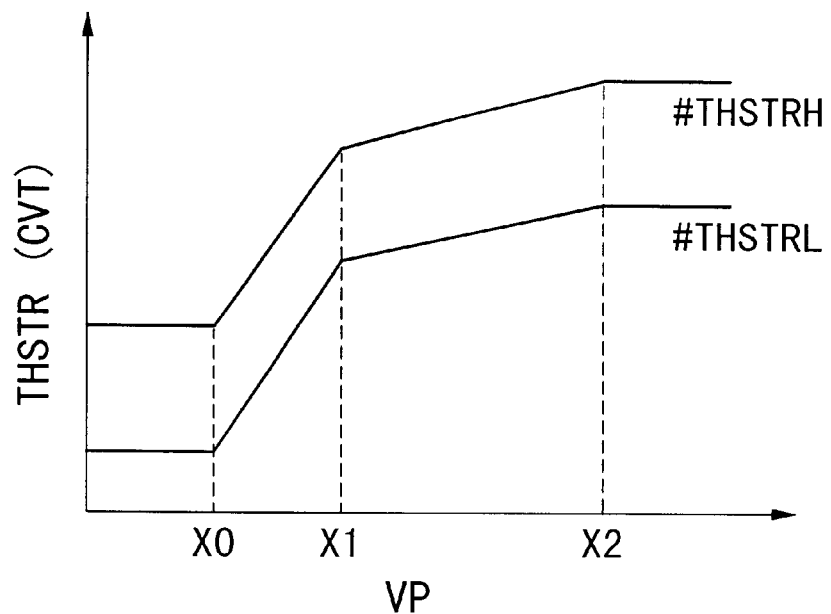
FIG. 36 is a graph showing a degree of throttle opening corresponding to a vehicle speed in the second embodiment of the present invention.

In step S1253, it is determined whether the MT/CVT determination flag F_AT is 1 or not. When the vehicle is a CVT vehicle, the flow proceeds to step S1254. When in step S1253 the vehicle is an MT vehicle, the flow proceeds to step S1256. In step S1254, as shown in FIG. 36, a starting assistance execution throttle opening degree lower limit value THSTR with hysteresis is looked up in a table, depending on the vehicle speed VP. In step S1255, it is determined whether the present degree of throttle opening THEM is equal to or above THSTR. When this determination is NO, that is, when the opening degree is low, the flow proceeds to step S1251. When in step S1255 the determination is YES, that is, when the opening degree is high, the flow proceeds to step S1258, the starting assistance request flag F_MASTSTR is set to 1, and the flow returns.

Figure 37:
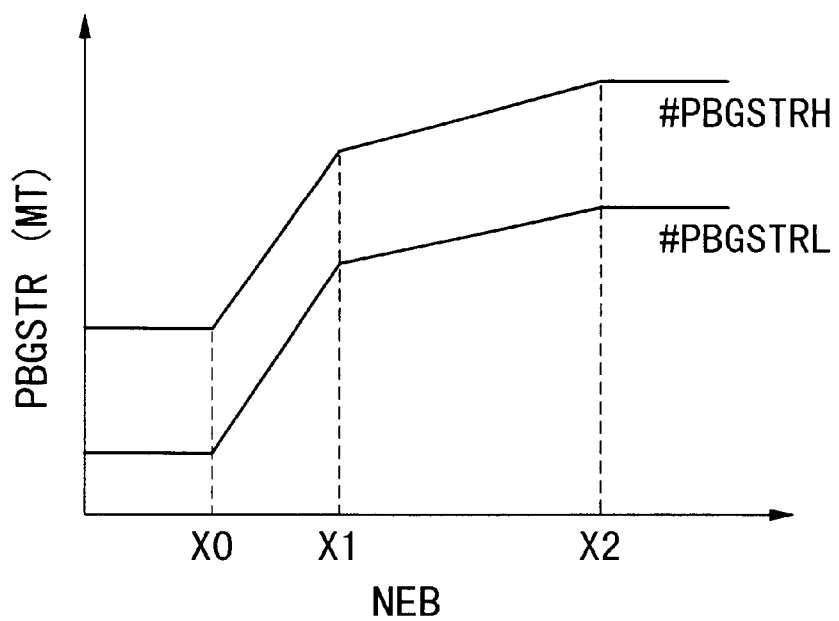
FIG. 37 is a graph showing an air intake passage pressure corresponding to a vehicle speed in the second embodiment of the present invention.

In step S1256, as shown in FIG. 37, a starting assistance execution air intake passage pressure (PB) lower limit value PBGSTR with hysteresis is looked up in a table, depending on the engine speed NEB. In step S1257, it is determined whether an air intake passage pressure PBG is equal to or above PBGSTR. When the determination is NO, that is, when the negative pressure is low, the flow proceeds to step S1251. When in step S1257 the determination is YES, that is, when the negative pressure is high, the flow proceeds to step S1258, the starting assistance request flag F_MASTSTR is set to 1, and the flow returns. Preferably, the assistance trigger threshold value of the starting assistance trigger is lower than that of the normal assistance trigger, so that the assistance can be easily started.

Thus, when starting the vehicle, an acceleration performance responsive to the driver's intention can be achieved.

[Starting Assistance Calculation Process]

Figure 38:
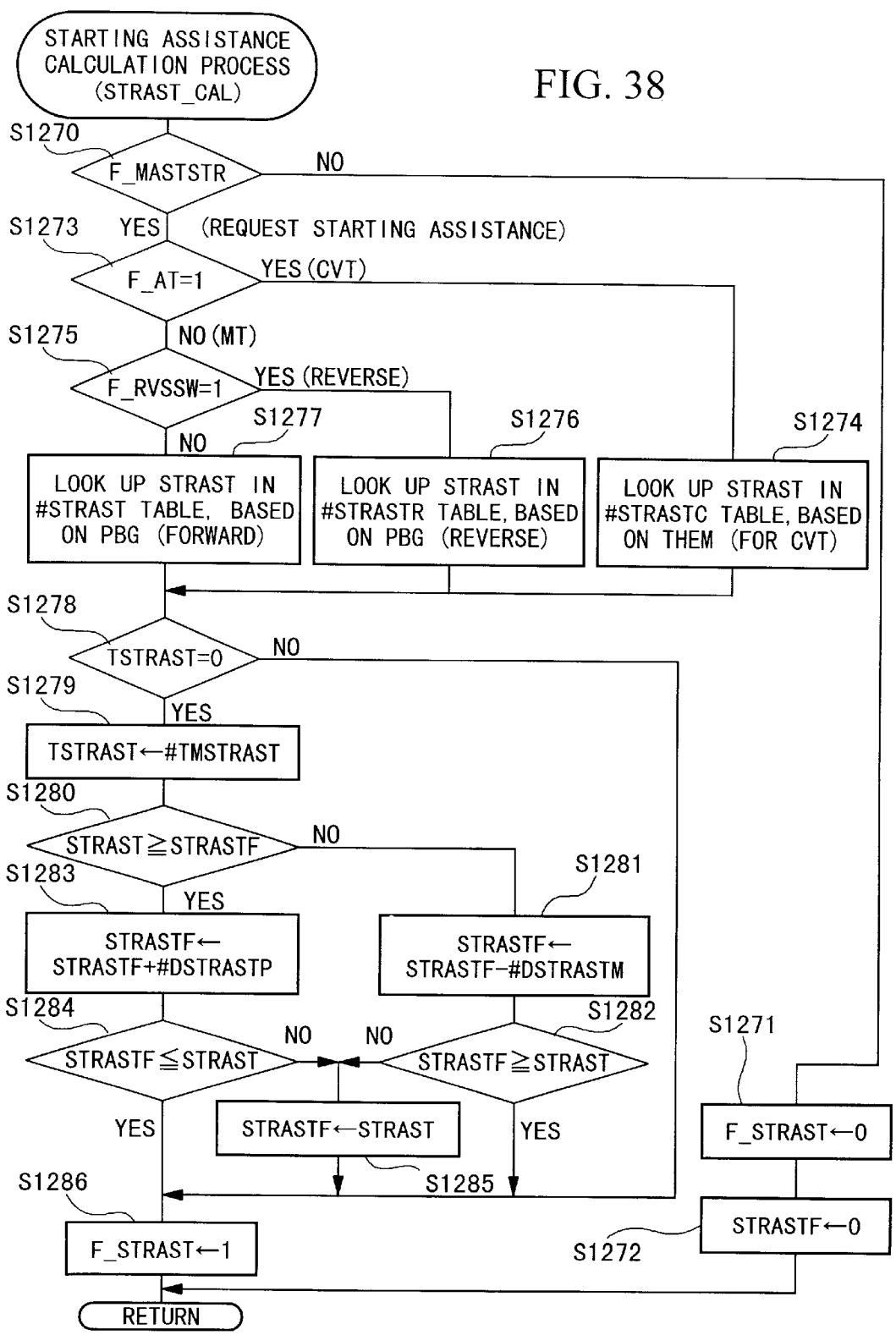
FIG. 38 is a flowchart showing the starting assistance calculation process of the second embodiment of the present invention.

FIG. 38 is a flowchart showing the starting assistance calculation process for mainly setting the assistance amount.

In step S1270, it is determined whether the starting assistance request flag F_MASTSTR is 1 or not. When the determination is NO, that is, when the starting assistance is not requested, the starting assistance permission flag F_STRAST is set to 0 in step S1271, the starting assistance final calculation value is set to 0, and the flow returns.

Figure 39:
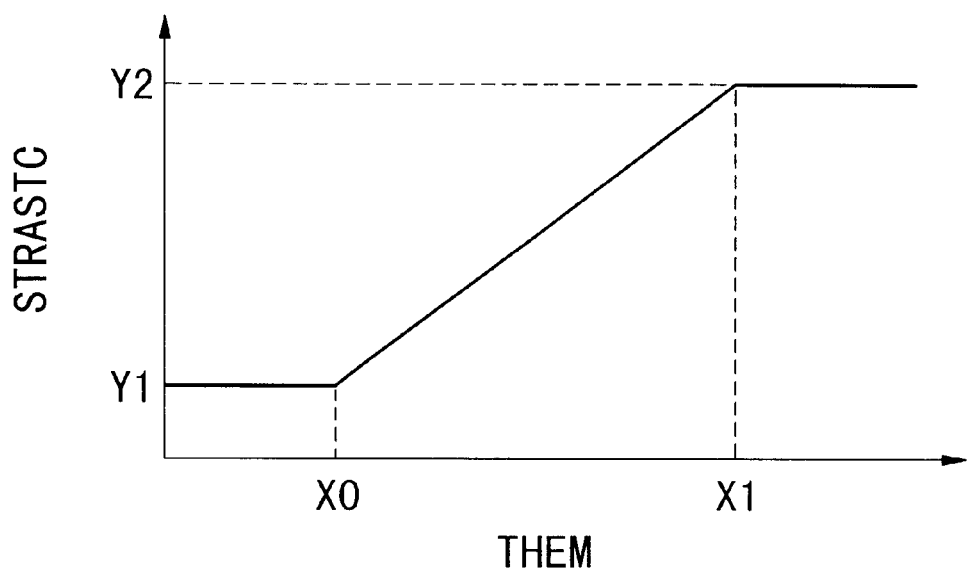
FIG. 39 is a graph showing an assistance amount corresponding to a degree of throttle opening in the second embodiment of the present invention.

When in step S1270 the determination is YES, that is, when the starting assistance is requested, the flow proceeds to step S1273, and it is determined whether the MT/CVT determination flag is 1 or not. When the vehicle is a CVT vehicle, the flow proceeds to step S1274, a starting assistance calculation value STRAST depending on the present degree of throttle opening THEM is looked up in a table as shown in FIG. 39, and the flow proceeds to step S1278.

When in step S1273 the vehicle is an MT vehicle, the flow proceeds to step S1275, and it is determined whether a reverse switch flag F_RVSSW is 1 or not. When "reverse" is determined, STRAST corresponding to the air intake passage pressure PBG is looked up in a table in step S1276 as shown in FIG. 40, and the flow proceeds to step S1278.

Figure 40:
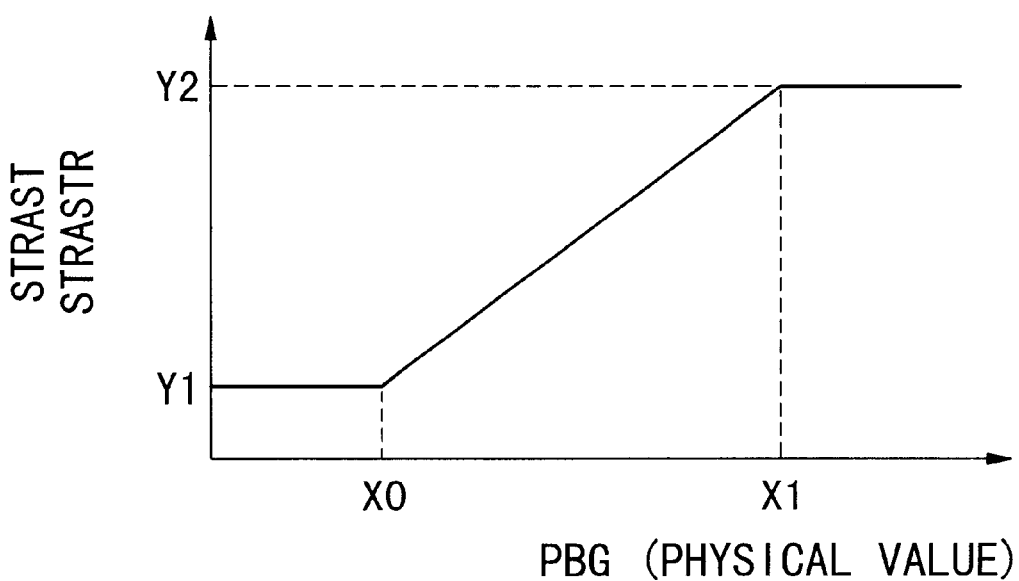
FIG. 40 is a graph showing an assistance amount corresponding to an air intake passage pressure in the second embodiment of the present invention.

When in step S1275 "forward" is determined, as shown in FIG. 40, STRAST corresponding to the air intake passage pressure PBG is looked up in a table in step S1277, and the flow proceeds to step S1278.

In step S1278, it is determined whether a gradual additional/subtractive timer TSTRAST is 0 or not. When it is not 0, the flow proceeds to step S1286. When it is 0, the flow proceeds to step S1279. In step S1279, the gradual additional/subtractive timer TSTRAST is set to a predetermined value #TMSTRAST (e.g., 50 ms), and the flow proceeds to step S1208.

In step S1280, it is determined whether the starting assistance calculation value STRAST is equal to or above the starting assistance final calculation value STRASTF or not. When in step S1280 the determination is YES, that is, when STRAST≧STRASTF, a gradual additional value #DSTRASTP (e.g., 0.1 kw) is added to STRASTF in step S1283, and it is determined in step S1284 whether STRASTF is equal to or below STRAST.

When in step S1284 the determination is YES, that is, when the starting assistance final calculation value STRASTF≦the starting assistance calculation value STRAST, the starting assistance permission flag F_STRAST is set to 1 in step S1286, and the flow returns. When in step S1284 the determination is NO, that is, when STRASTF>STRAST, STRASTF is set to STRAST in step S1285, and the flow proceeds to step S1286.

When in step S1280 the determination is NO, that is, when the starting assistance calculation value STRAST<the starting assistance final calculation value STRASTF, a gradual subtractive value #DSTRASTM (e.g., 0.1 kw) is subtracted from STRASTF in step S1281, and it is determined in step S1282 whether STRASTF is equal to or above STRAST or not.

When in step S1282 the determination is YES, that is, when the starting assistance final calculation value STRASTF≧the starting assistance calculation value STRAST, the flow proceeds to step S1286. When in step S1282 the determination is NO, that is, when STRASTF<STRAST, the flow proceeds to step S1285.

Thus, because the assistance amount is gradually increased or decreased in a time set by the timer, smooth acceleration can be achieved, eliminating a jolt when the assistance terminates. Because The gradual additional value #DSTRASTP is greater than the gradual additional value #DACCASTP in step S1212, the starting assistance is started more sharply than the normal assist.

[Boost Assistance Trigger Determination]

Figure 41:
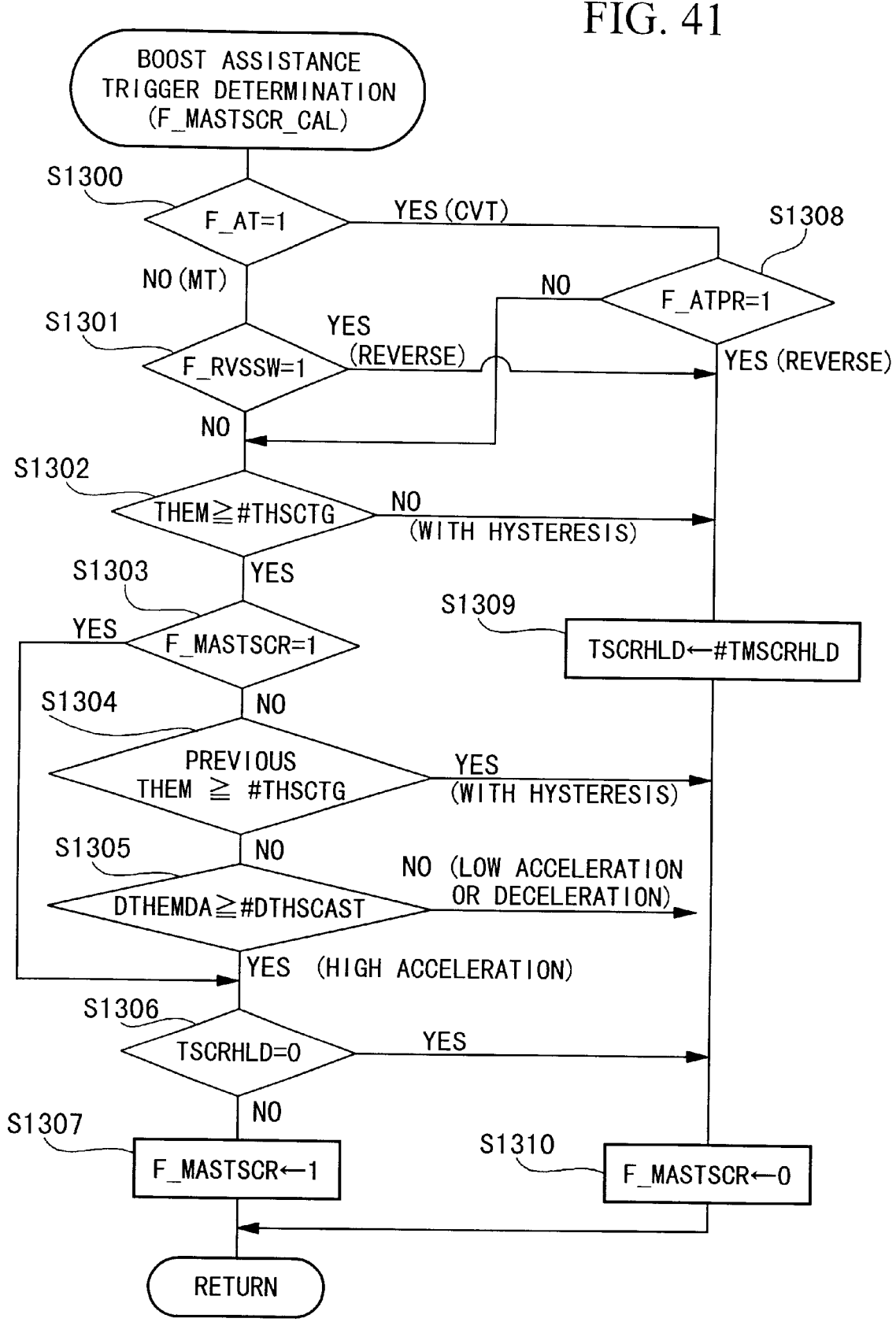
FIG. 41 is a flowchart showing the boost assistance trigger determination in the second embodiment of the present invention.

FIG. 41 is a flowchart showing the boost assistance trigger determination in step S1103.

In step S1300, it is determined whether the MT/CVT determination flag is 1 or not. When the vehicle is a CVT vehicle, the flow proceeds to step S1308, and the state of the reverse position flag F_ATPR is determined. When "reverse" is determined, the flow proceeds to step S1309, a boost assistance maintaining timer TSCRMHLD is set to a predetermined value #TMSCRHLD (e.g., 5 sec), the boost assistance request flag F_MASTSCR is set to 0 in step S1310, and the flow returns. When in step S1308 "forward" is determined, the flow proceeds to step S1302.

Figure 42:
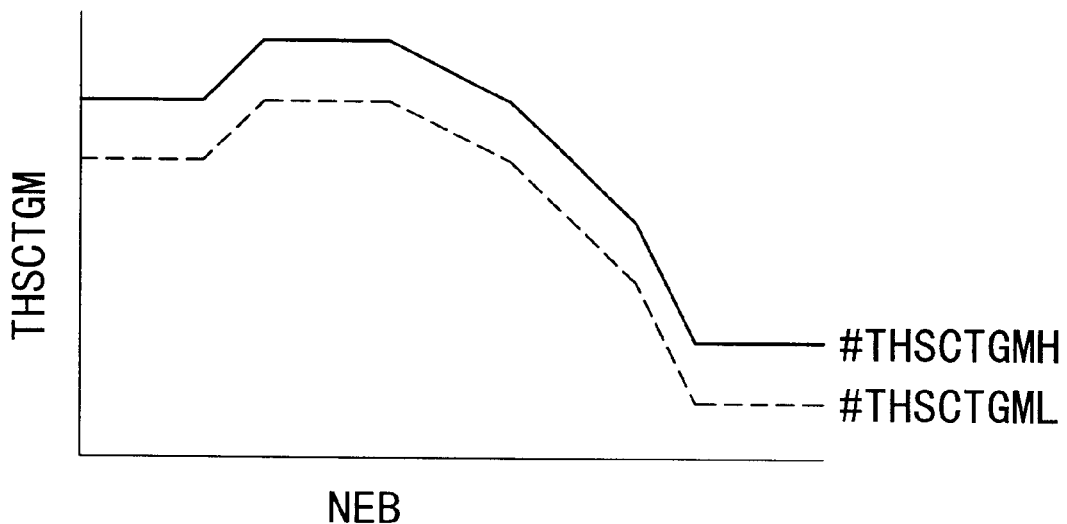
FIG. 42 is a graph showing the relationship between an engine speed and a boost assistance execution lower limit throttle in the second embodiment of the present invention.
Figure 43:
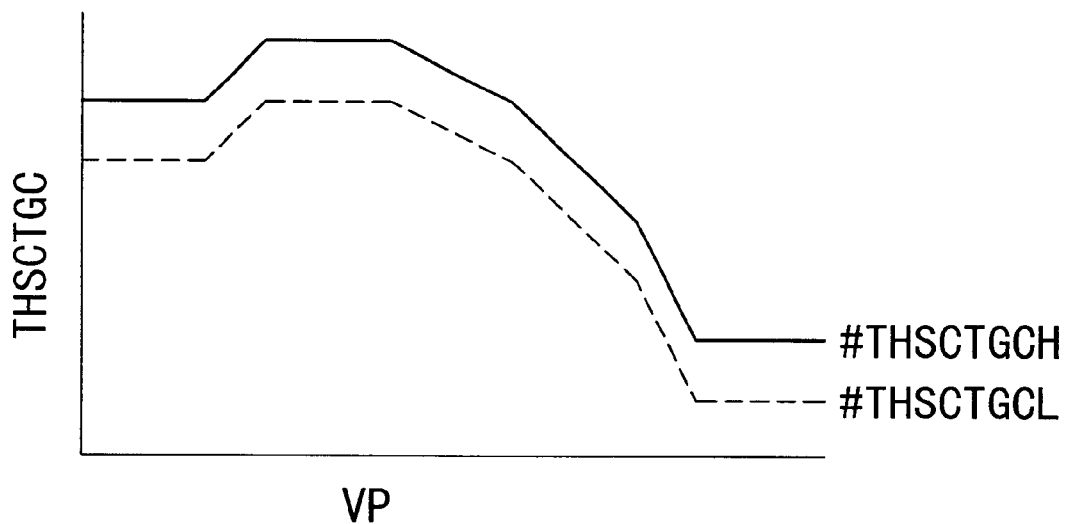
FIG. 43 is a graph showing the relationship between an air intake passage pressure and a boost assistance execution lower limit throttle in the second embodiment of the present invention.

When in step S1300 the vehicle is an MT vehicle, the flow proceeds to step S1301, and it is determined whether the reverse switch flag F_RVSSW is 1 or not. When "reverse" is determined, the flow proceeds to step S1309. When in step S1301 "forward" is determined, the flow proceeds to step S1302. In step S1302, it is determined whether the present degree of throttle opening THEM is equal to or above a boost assistance execution lower limit throttle opening degree #THSCTG or not. To obtain #THSCTG, in case of an MT vehicle, a value (with hysteresis) corresponding to the engine speed NEB is looked up in a table as shown in FIG. 42, whereas in case of a CVT vehicle a value corresponding to the vehicle speed VP (with hysteresis) is looked up in a table as shown in FIG. 43.

When in step S1302 the present degree of throttle opening THEM is below the boost assistance execution lower limit throttle opening degree #THSCTG, the flow proceeds to step S1309. When THEM is equal to or above #THSCTG, the flow proceeds to step S1303, and it is determined whether the boost assistance request flag F_MASTSCR is 1 or not. When the determination is YES, the flow proceeds to step S1306. When in step S1303 the determination is NO, the flow proceeds to step S1304.

When in step S1304, it is determined whether or not the previous degree of throttle opening THEM is equal to or above the boost assistance execution lower limit throttle opening degree #THSCTG. When in step S1304 the previous THEM is below #THSCTG, the flow proceeds to step S1305. When the previous THEM is equal to or above #THSCTG, the flow proceeds to step S1310 because the degree of throttle opening is maintained to be high.

In step S1305, it is determined whether or not the present variation DTHEM in the operation of the throttle is equal to or above a boost assistance determination throttle variation #DTHSCAST (e.g., 1 degree). When this determination is YES, that is, when the acceleration is high, it is determined in step S1306 whether the boost assistance maintaining timer TSCRHLD has been reset or not. When it has been reset, the flow proceeds to step S1310. When the timer has not been reset, the boost assistance request flag F_MASTSCR is set to 1 in step S1307, and the flow returns. While in step S1302 the degree of throttle opening is compared with the threshold value, the depression of the accelerator pedal may be compared with the threshold value.

[Boost Assistance Calculation Process]

Figure 44:
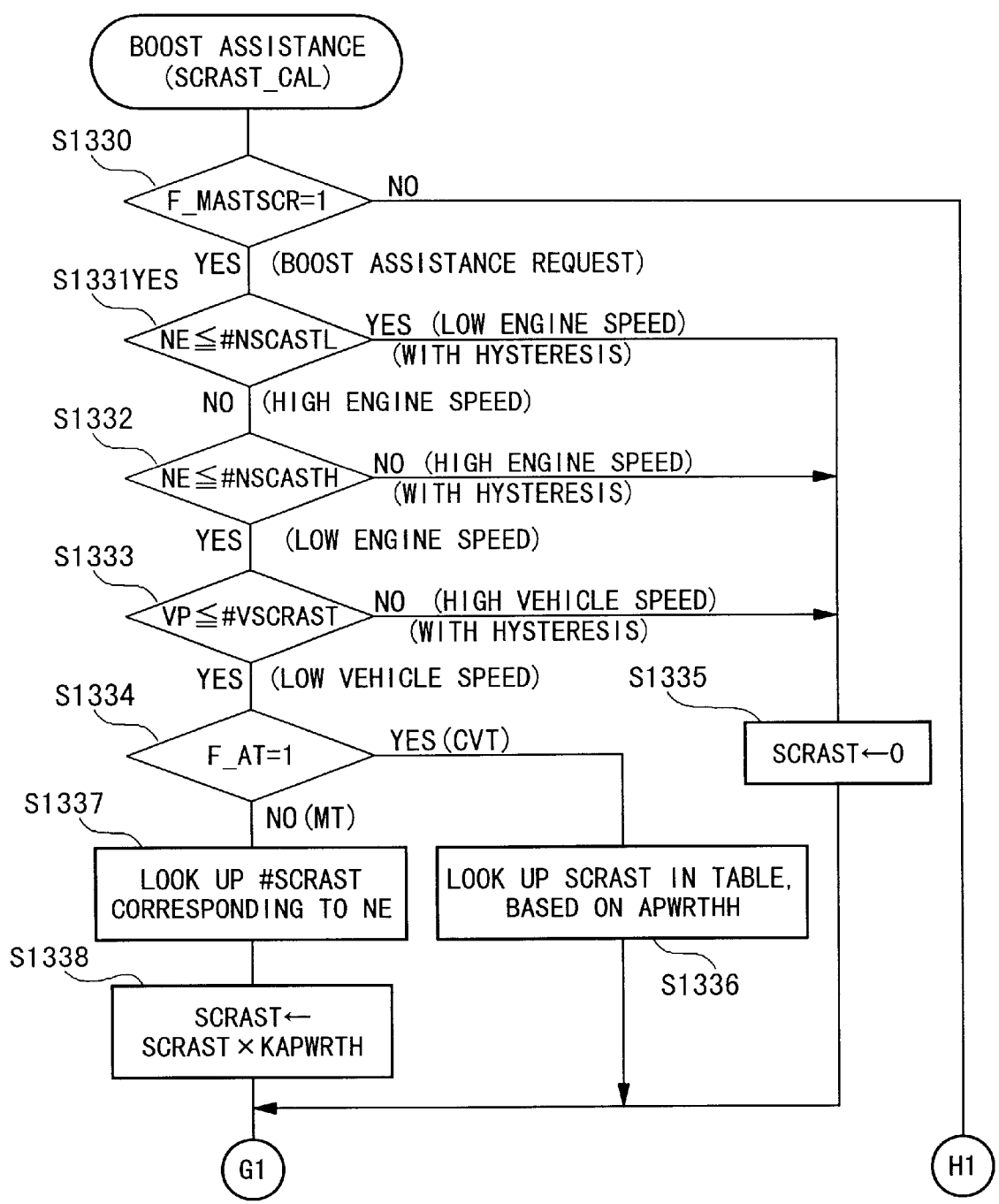
FIG. 44 is a flowchart for determining the assistance amount for the boost assistance trigger in the second embodiment of the present invention.
Figure 45:
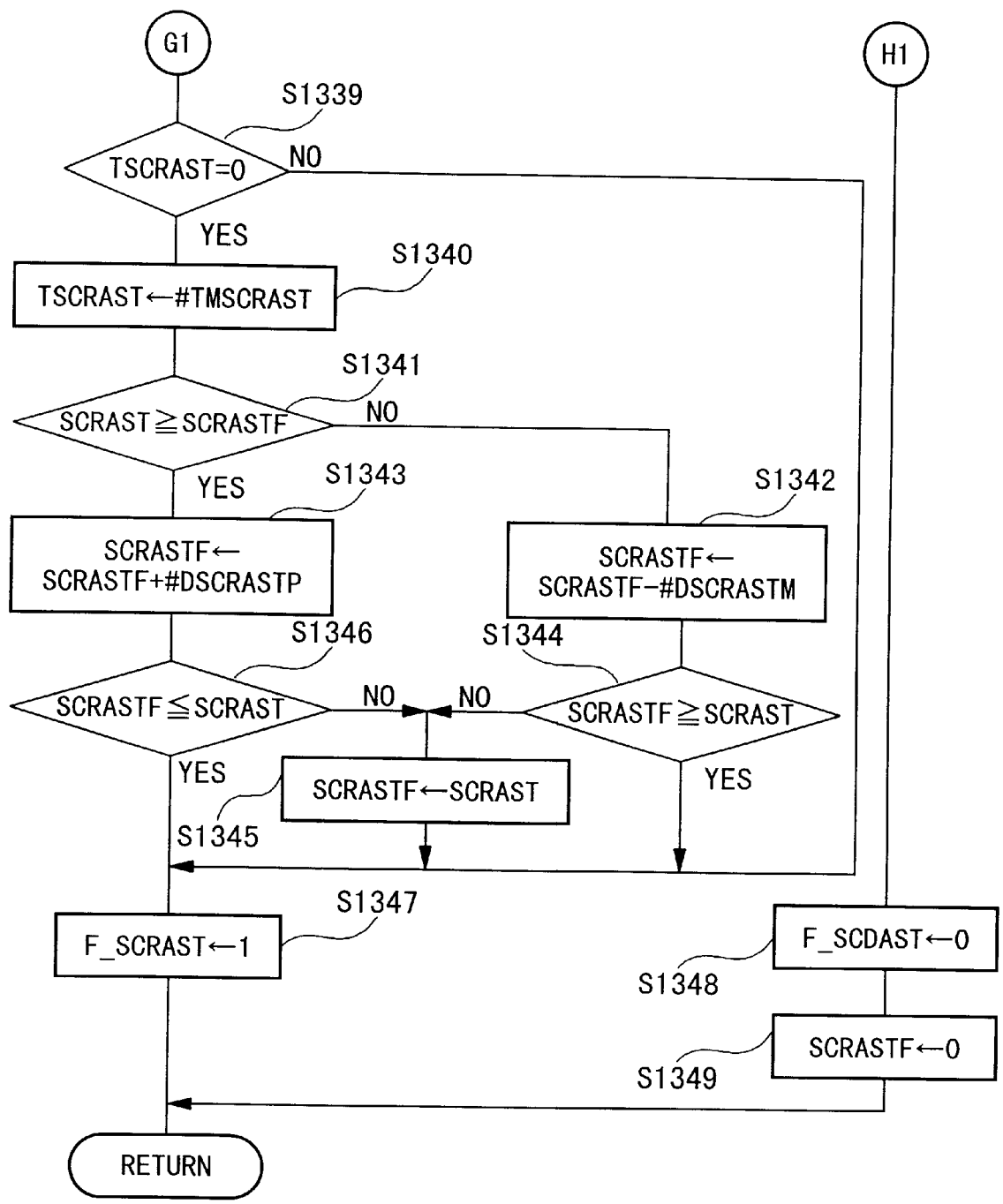
FIG. 45 is a flowchart for determining the assistance amount for the boost assistance trigger in the second embodiment of the present invention.

FIGS. 44 and 45 are flowcharts showing the boost assistance calculation process.

In step S1330, it is determined whether the boost assistance request flag F_MASTSCR is 1 or not. When the determination is NO, that is, when F_MASTSCR is 0, the boost assistance permission flag F_SCRAST is set to 0 in step S1348, the boost assistance final calculation value SCRASTF is set to 0 in step S1349, and the flow returns.

When in step S1303 the determination is YES, that is, when the boost assistance request flag F_MASTSCR is 1, the flow proceeds to step S1331, and it is then determined whether or not the engine speed NE is equal to or below the boost assistance execution lower limit value #NSCASTL (with hysteresis of, e.g., a lower limit: 800 rpm, and an upper limit: 1000 rpm).

When in step S1331 the engine speed NE is low and is equal to or below the boost assistance execution lower limit value #NSCASTL, the flow proceeds to step S1335. In step S1335, the boost assistance amount SCRAST is set to 0, and the flow proceeds to step S1338.

When in step S1331 the engine speed NE is high and is above the boost assistance execution lower limit value #NSCASTL, the flow proceeds to step S1332, and it is then determined whether or not NE is equal to or below a boost assistance execution upper limit value #NSCASTH (with hysteresis of, e.g., a lower limit: 4000 rpm, and an upper limit: 4200 rpm).

When in step S1332 the engine speed NE is high and is above the boost assistance execution upper limit value #NSCASTH, the flow proceeds to step S1335. When in step S1332 NE is low and equal to or below #NSCASTH, the flow proceeds to step S1333.

In step S1333, it is determined whether or not the vehicle speed VP is equal to or below a boost assistance execution upper limit vehicle speed #VSCRAST (with hysteresis of, e.g., a lower limit 140 km/h, and an upper limit 150 km/h).

In the process from step S1331 to step S1333 for calculating the boost assistance amount, the engine speed NE and the vehicle speed VP are restricted to a specified range. The reason for this is that the boost assistance control decreases the driving force in the shift-change action, and the main purpose of the process is to improve the output response in the zone within which the load on the engine is medium.

When in step S1333 the vehicle speed VP is high and is above the boost assistance execution upper limit vehicle speed #VSCRAST, the flow proceeds to step S1335. When in step S1333 VP is equal to or below #VSCRAST, the flow proceeds to step S1334. In step S1334, it is determined whether the MT/CVT determination flag F_AT is 1 or not. When the vehicle is a CVT vehicle, the flow proceeds to step S1336, a boost assistance amount SCRAST is looked up in a table, based on the upper threshold value shown in FIG. 13, and the flow proceeds to step S1338. When in step S1334 the vehicle is an MT vehicle, the assistance amount #SCRAST corresponding to the engine speed NE is looked up, and the boost assistance calculation value SCRAST is set in step S1337 as shown in FIG. 18, and the flow proceeds to step S1338. The assistance amount #SCRAST is changed depending on the respective gears.

In step S1338, the boost assistance calculation value SCRAST is multiplied by the throttle assistance amount coefficient KAPWRTH obtained in FIG. 11. In step S1339, a gradual additional/subtractive updating timer TSCRAST is 0 or not. When this determination is NO, the flow proceeds to step S1347. When in step S1339 the determination is YES, the flow proceed to step S1340, and TSCRAST is set to a predetermined value #TMSCRAST, e.g., 50 ms.

In step S1341, it is determined whether or not the boost assistance calculation value SCRAST is equal to or above the boost assistance final calculation value SCRASTF. When the determination is YES, that is, when SCRAST≧SCRASTF, a gradual additional value #DSCRASTP (e.g., 1 kw) is added to SCRASTF in step S1343, and it is determined in step S1346 whether SCRASTF is equal to or below SCRAST or not.

When in step S1346 the determination is YES, that is, when the boost assistance final calculation value SCRASTF≦the boost assistance calculation value SCRAST in step S1345, the boost assistance permission flag F_SCRAST is set to 1 in step S1347, and the flow returns.

When in step S1346 the determination is NO, that is, when the boost assistance final calculation value SCRASTF>the boost assistance calculation value SCRAST, SCRASTF is set to SCRAST, and the flow proceeds to step S1347.

When in step S1341 the determination is NO, that is, when the boost assistance calculation value SCRAST<the boost assistance final calculation value SCRASTF, a gradual subtractive value #DSCRASTM (e.g., 500 W) is subtracted from SCRASTF in step S1342, and it is determined in step S1344 whether SCRASTF is equal to or above SCRAST or not.

When in step S1344 the determination is YES, that is, when the boost assistance final calculation value SCRASTF≧the boost assistance calculation value SCRAST, the flow proceeds to step S1347. When in step S1344 the determination is NO, that is, when the SCRASTF<SCRAST, the flow proceeds to step S1345.

Thus, the boost assistance trigger determination prevents the decrease in the torque regardless of an MT vehicle or a CVT vehicle. Even when the gear ratios are high so as to allow the engine to drive at a low speed in order to improve the fuel consumption, the shortage of torque can be compensated in the shift-change action. For example, when a driver releases an accelerator pedal before a curve and accelerates the vehicle at the end of the curve, the vehicle is sufficiently responsive to the driver's intention, and an improved riding conform comfort can be provided. Even when there are great differences between the first and second gears and between the second and third gears, the shift-change action can be smoothly conducted.

According to the embodiment, when the driver intends to accelerate the vehicle, specifically, whenever normally accelerating the vehicle, starting the vehicle, and changing the gear, the assistance to the engine is performed with an appropriate assistance amount at an appropriate timing to meet the driver's request, and an improved riding comfort can be achieved.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A control system for a hybrid vehicle with a combustion engine for outputting a driving force, an electric motor for generating a force for assisting the output from the engine, and a power storage unit for supplying power to the motor and for storing energy regenerated by the motor when the vehicle decelerates, said control system comprising:

an assistance determining device for determining whether or not to assist the output from the engine by the motor, depending on the driving condition of the vehicle;

a first assistance amount determining device for determining a first assistance amount, depending on the driving condition of the vehicle, when the assistance determining device determines to perform the assist;

a second assistance amount determining device for determining a second assistance amount, when a driver's intention to accelerate the vehicle exceeds a predetermined standard; and an assistance control device for driving the motor to assist the output from the engine, based on the first assistance amount when a driver's intention to accelerate the vehicle does not exceed a predetermined standard, and based on the second assistance amount when the driver's intention to accelerate the vehicle exceeds the predetermined standard.

2. A control system for a hybrid vehicle according to claim 1, further comprising:

an assistance time determining device for determining a period of time to maintain the assistance based on the second assistance amount; and an assistance amount gradual changer for gradually increasing the present assistance amount to the second assistance amount at the beginning of the period of time set by the assistance time determining device, and for gradually decreasing the second assistance amount at the end of the set period of time.

3. A control system for a hybrid vehicle according to claim 1, further comprising a driver's intention determining device for determining that the driver's intention to accelerate the vehicle exceeds a predetermined standard, when a throttle opening is above a predetermined value and a variation in the throttle opening state is above a predetermined value.

4. A control system for a hybrid vehicle according to claim 1, wherein the assistance determining device comprises:
　　a starting assistance determining device for determining whether or not to perform starting assistance when starting the vehicle;
　　a boost assistance determining device for determining whether to perform boost assistance when in a gear-shift action; and
　　a normal assistance determining device for making the determination when the vehicle accelerates in a situation other than when starting the vehicle or in the gear-shift action,
　　the first assistance amount determining device comprises a normal assistance amount determining device for determining a normal assistance amount when the normal assistance determining device determines to perform the assist, the second assistance amount determining device comprises:
　　a starting assistance amount determining device for determining a starting assistance amount when the starting assistance determining device determines to perform the assist; and
　　a boost assistance amount determining device for determining a boost assistance amount when the boost assistance determining device determines to perform the assist, and the assistance control device comprises:
　　an assistance amount selector for selecting one among the starting assistance amount, the boost assistance amount, and the normal assistance amount, when the assistance determining device determines at least one of the starting assist, the boost assist, and the normal assist; and
　　an assistance controller for driving the motor to assist the output from the engine, based on the selected assistance amount.

5. A control system for a hybrid vehicle according to claim 4, wherein the assistance amount selector selects the greatest one among the starting assistance amount, the boost assistance amount, and the normal assistance amount.

6. A control system for a hybrid vehicle according to claim 4, wherein the starting assistance determining device determines whether or not to perform the assist, based on at least an engine speed and a vehicle speed.

7. A control system for a hybrid vehicle according to claim 4, wherein the starting assistance determining device determines whether or not to perform the assist, based on at least one of a throttle opening state and an air intake passage pressure.

8. A control system for a hybrid vehicle according to claim 4, wherein the boost assistance determining device determines whether or not to perform the assist, based on a throttle opening state and a variation in the throttle opening state.

9. A control system for a hybrid vehicle according to claim 4, wherein the boost assistance amount determining device sets the assistance amount, based on at least an engine speed.

* * * * *